(12) United States Patent
Ishii et al.

(10) Patent No.: US 9,248,659 B2
(45) Date of Patent: Feb. 2, 2016

(54) FILTER UNIT, LIQUID EJECTING HEAD, AND LIQUID EJECTING APPARATUS

(71) Applicant: Seiko Epson Corporation, Shinjuku-ku (JP)

(72) Inventors: Hiroyuki Ishii, Shiojiri (JP); Hiroyuki Hagiwara, Matsumoto (JP); Masayuki Eguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/579,117

(22) Filed: Dec. 22, 2014

(65) Prior Publication Data

US 2015/0183225 A1    Jul. 2, 2015

(30) Foreign Application Priority Data

Dec. 26, 2013   (JP) .................................. 2013-270548

(51) Int. Cl.
*B41J 2/175* (2006.01)
*B01D 35/02* (2006.01)

(52) U.S. Cl.
CPC ............. *B41J 2/17563* (2013.01); *B01D 35/02* (2013.01)

(58) Field of Classification Search
None
See application file for complete search history.

(56) References Cited

U.S. PATENT DOCUMENTS

| 6,152,559 | A | * | 11/2000 | Kojima | ........................... 347/89 |
| 7,419,257 | B2 | * | 9/2008 | Mouri et al. | .................. 347/103 |
| 7,506,974 | B2 | * | 3/2009 | Hirakawa | ...................... 347/101 |
| 2005/0243147 | A1 | * | 11/2005 | Qingguo et al. | ................ 347/84 |
| 2005/0264627 | A1 | * | 12/2005 | Kim | ...................... B41J 2/1404 347/92 |
| 2006/0201870 | A1 | * | 9/2006 | Seto | ...................... B01D 29/15 210/435 |
| 2011/0279606 | A1 | * | 11/2011 | Oguchi et al. | .................. 347/93 |
| 2012/0050428 | A1 | * | 3/2012 | Rike et al. | ...................... 347/93 |

FOREIGN PATENT DOCUMENTS

| JP | 2007-168220 A | 7/2007 |
| JP | 2013-159051 A | 8/2013 |

* cited by examiner

*Primary Examiner* — Stephen Meier
*Assistant Examiner* — John P Zimmermann
(74) *Attorney, Agent, or Firm* — Kilpatrick Townsend & Stockton LLP

(57) ABSTRACT

A filter unit including a liquid flow path through which ink flows and a filter chamber which forms a portion of the liquid flow path and is filled with a pressurized ink includes a filter unit main body and a second cover member which include the liquid flow path and form the filter chamber; and a filter which is disposed within the filter chamber, the second cover member being provided with a protruding portion in a region which opposes the filter, and the protruding portion being provided between a supply port of the ink which is supplied to the filter chamber and a discharge port of the ink which is discharged from the filter chamber in plan view in relation to the filter.

19 Claims, 16 Drawing Sheets

FILTER UNIT, LIQUID EJECTING HEAD, AND LIQUID EJECTING APPARATUS

BACKGROUND

1. Technical Field

The present invention relates to a filter unit, a liquid ejecting head, and a liquid ejecting apparatus. In particular, the invention relates to a filter unit through which an ink flows as a liquid, an ink jet recording head which ejects the ink, and an ink jet recording apparatus.

2. Related Art

An ink jet recording head which discharges ink droplets is a representative example of the liquid ejecting head which discharges liquid droplets. An ink jet recording head which includes, for example, a head main body which discharges ink droplets from a nozzle opening and a filter unit (a flow path member) which supplies an ink from an ink cartridge (a liquid storage member), in which the ink is stored, to the head main body is proposed (for example refer to JP-A-2013-159051).

The filter unit includes an ink flow path which includes a filter chamber in which a filter is disposed, and which removes bubbles and foreign matter contained in the ink by filtration. Specifically, the filter unit is provided with a first member and a second member, in each of which a flow path is formed. A concave portion which is open to the second member side is formed in the first member of the downstream side, and a filter is thermally welded so as to cover the flow path which communicates with the concave portion. The filter chamber is formed in the concave portion which is sealed by the second member of the upstream side. A wall surface which forms the filter chamber of the second member is a tapered portion with a diameter which widens toward the first member side.

In the filter unit, the initial filling of the ink is performed by sucking the ink from the flow path of the first member of the downstream side. When the filter chamber is simply formed to be wider than the flow path, the flow speed decreases in the proximity of the circumference of the filter chamber. Therefore, by forming the wall surface of the filter chamber of the second member in a tapered shape, the distance between the wall surface and the filter surface decreases toward the circumference; thus, the reduction in flow speed in the filter chamber is suppressed. Since the reduction in flow speed in the filter chamber is suppressed, it is possible to favorably discharge bubbles within the filter chamber.

However, when filling of the ink from the flow path of the second member of the upstream side is carried out with the ink being pressurized, a portion of the bubbles in the filter chamber does not pass through the filter and remains pushed against the edges of a tapered portion. There is a concern that, during the printing or the like, bubbles which remain in the filter chamber will pass through the filter, reach the head main body and cause nozzle clogging and discharge problems.

Note that, this problem is present not only in a filter unit through which the ink flows, an ink jet recording head which discharges the ink, and an ink jet recording apparatus including the ink jet recording head, but also in the same manner in a filter unit through which a liquid other than the ink flows, a liquid ejecting head which ejects the liquid and a liquid ejecting apparatus.

SUMMARY

An advantage of some aspects of the invention is to provide a filter unit, a liquid ejecting head, and a liquid ejecting apparatus, each of which being capable of suppressing the retention of bubbles when filling of a pressurized liquid from the upstream side is carried out.

According to an aspect of the invention, a filter unit includes a liquid flow path through which a liquid flows and a filter chamber which forms a portion of the liquid flow path and is filled with a pressurized liquid. The filter unit includes a first member and a second member which include the liquid flow path and form the filter chamber; and a filter which is disposed within the filter chamber. The second member is provided with a protruding portion in a region which opposes the filter, and the protruding portion is provided between a supply port of the liquid which is supplied to the filter chamber and a discharge port of the liquid which is discharged from the filter chamber in plan view in relation to the filter.

In this aspect, when the filter chamber of the filter unit is filled with a pressurized liquid, the liquid flows through the filter chamber so as to bypass the protruding portion which is provided in the filter chamber. Therefore, the liquid even flows in the edges of the filter chamber and it is possible to suppress the retention of bubbles. Accordingly, it is possible to reduce the likelihood of bubbles remaining in the filter chamber during the initial filling of the liquid or the like, the bubbles being unintentionally discharged during the discharging of the liquid or the like, and the nozzle openings being clogged by the bubbles.

Here, an area of the region of the protruding portion which opposes the filter may be smaller than an area of an effective region which forms a portion of the filter and covers an opening of the liquid flow path closer to a downstream side than the filter in the liquid flow path in plan view in relation to the filter. Accordingly, even when the protruding portion is not large enough to cover the entire effective region of the filter, it is possible to suppress the retention of bubbles in the filter chamber when filling the filter chamber of the filter unit with a pressurized liquid.

The protruding portion may be contained inside the filter in plan view in relation to the filter. Accordingly, it is possible to cause the liquid which bypasses the protruding portion to flow more reliably in the filter chamber.

The first member may include a ring-shaped rib which surrounds the liquid flow path that is open to the inside of the filter chamber, the filter may be thermally welded to the rib and seal the liquid flow path, and the protruding portion may be contained inside the rib in plan view in relation to the filter. Accordingly, the protruding portion is not present outside of the rib. Accordingly, on the outside of the rib of the filter chamber, since there is no restriction by the protruding portion, it is possible to secure a larger interval between the first member and the second member. Therefore, it is possible to suppress the pushing of the bubbles to the outside of the rib of the filter chamber when carrying out the pressurized filling of the ink.

A groove portion which is open to the second member side may be provided in the first member, a seal portion which protrudes to the first member side may be provided in the second member, the seal portion may be inserted into the groove portion to form the filter chamber, and a space between the inner surface of the groove portion and sides of the sealing portion may be filled with a sealant. Accordingly, since the gap between the inner surface of the groove portion and the sides of the sealing portion is filled with the sealant, it is possible to suppress the intrusion of bubbles into the gap.

According to another aspect of the invention, a liquid ejecting head includes the filter unit described above.

In this aspect, when the filter chamber is initially filled with a pressurized liquid, it is possible to suppress the retention of bubbles in the filter chamber. Accordingly, it is possible to suppress clogging of the nozzle openings and discharge problems caused by bubbles from the filter chamber during discharging of the liquid or the like.

The liquid ejecting head according to the aspect described above may further include a plurality of pressure generating chambers arranged along a first direction; and a manifold which communicates with each of the pressure generating chambers. The manifold may communicate with the liquid flow path including the filter chamber. A supply port of the liquid which is supplied to the filter chamber and a discharge port of the liquid which is discharged from the filter chamber may be formed in the filter chamber. The supply port may be disposed closer to the inside than the manifold in the first direction. Accordingly, it is possible to reduce the size of the liquid ejecting head in the first direction.

According to still another aspect of the invention, a liquid ejecting apparatus includes the liquid ejecting head according to the aspect described above; and a pressurized filling mechanism which causes a pressurized liquid to flow into the filter chamber.

In this aspect, it is possible to fill the liquid flow path of the liquid ejecting head with a pressurized liquid using the pressurized filling mechanism, and it is possible to suppress the retention of bubbles in the filter chamber. Accordingly, clogging of the nozzle openings and discharge problems caused by the bubbles retained in the filter chamber being supplied to the liquid ejecting head at an unintended timing are suppressed, and the liquid ejecting apparatus with improved reliability is provided.

Here, the liquid ejecting apparatus may further include a transport mechanism which transports a recording medium along a transport path; and first and second liquid ejecting heads disposed along the transport path. The first and second liquid ejecting heads may have liquid ejecting surfaces disposed in a direction in which the liquid ejecting surfaces intersect each other. Accordingly, the first and second liquid ejecting heads include liquid ejecting surfaces which intersect each other in the vertical direction. In other words, the liquid ejecting head is inclined in the vertical direction, and the filter chamber is also mounted on the liquid ejecting apparatus in an inclined state. Even in this aspect, since this does not change the fact that the protruding portion is provided between the supply port and the discharge port, it is possible to cause the liquid to flow through the peripheral edge of the filter chamber at a high speed even if the filter chamber is filled with the pressurized liquid, and it is possible to suppress the retention of bubbles in the filter chamber.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, detailed description will be given of an embodiment of the invention. The ink jet recording head is an example of a liquid ejecting head and is also simply referred to as a recording head.

Figure 1:
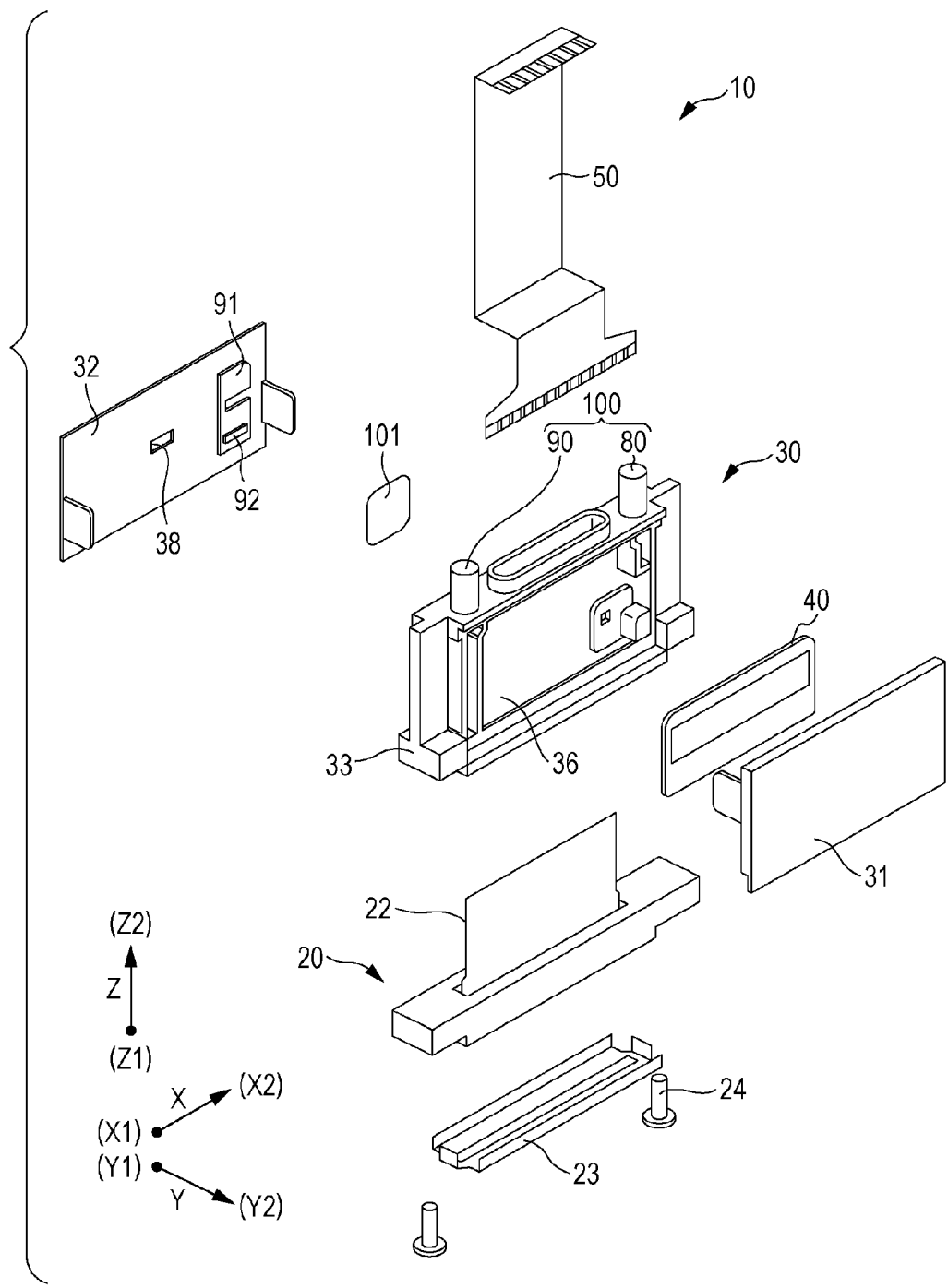
FIG. 1 is an exploded perspective view of a recording head according to a first embodiment.
Figure 2:
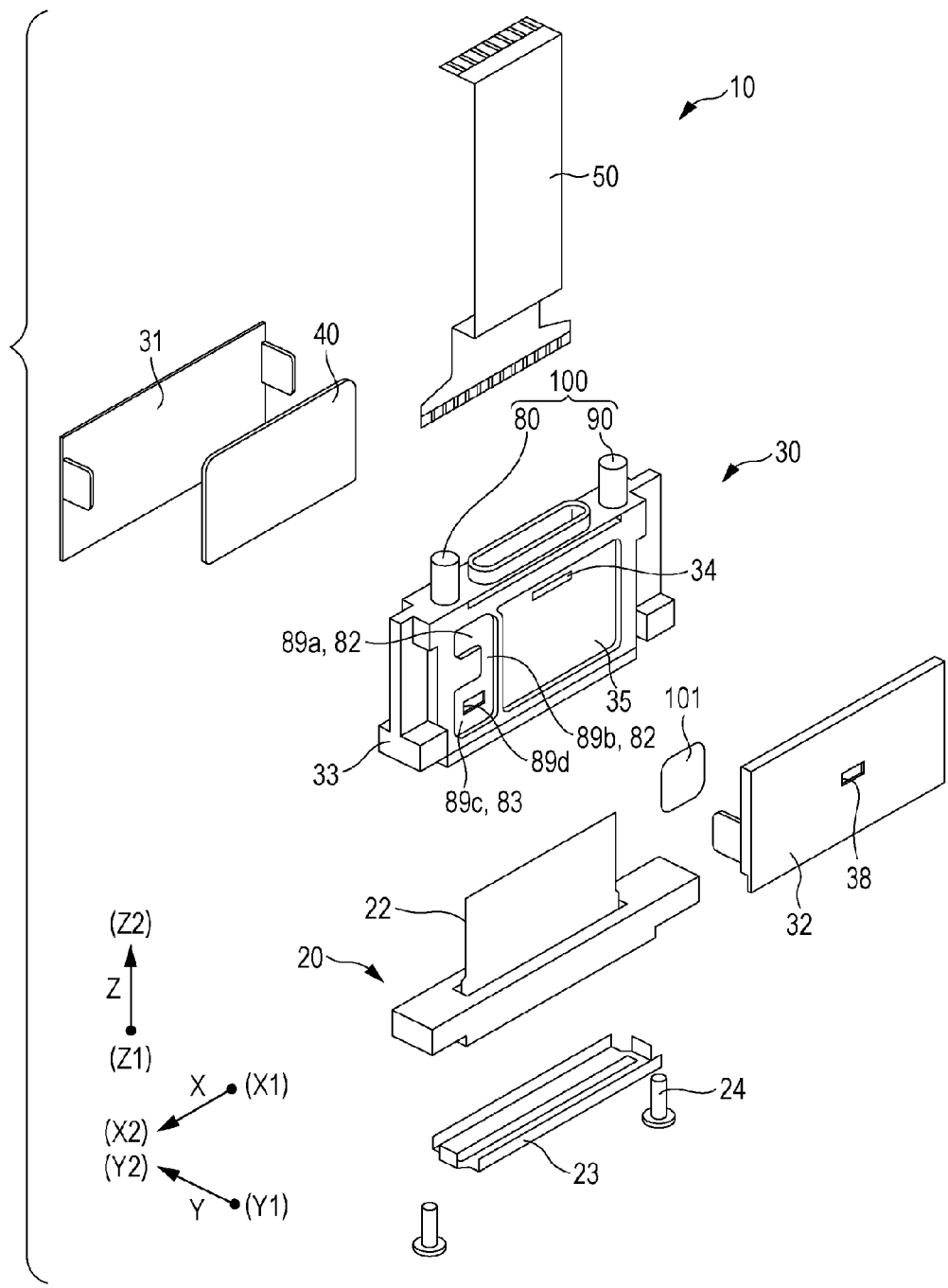
FIG. 2 is an exploded perspective view of the recording head according to the first embodiment.

FIGS. 1 and 2 are exploded perspective views of a recording head according to the present embodiment. As illustrated in FIGS. 1 and 2, a recording head 10 of the present embodiment includes a head main body 20, a filter unit 30, a circuit board 40, and a wiring substrate 50. The head main body 20 discharges ink droplets as the liquid, the filter unit 30 supplies the ink to the head main body 20, the circuit board 40 is held by the filter unit 30, and the wiring substrate 50 is connected to the circuit board 40.

Figure 3:
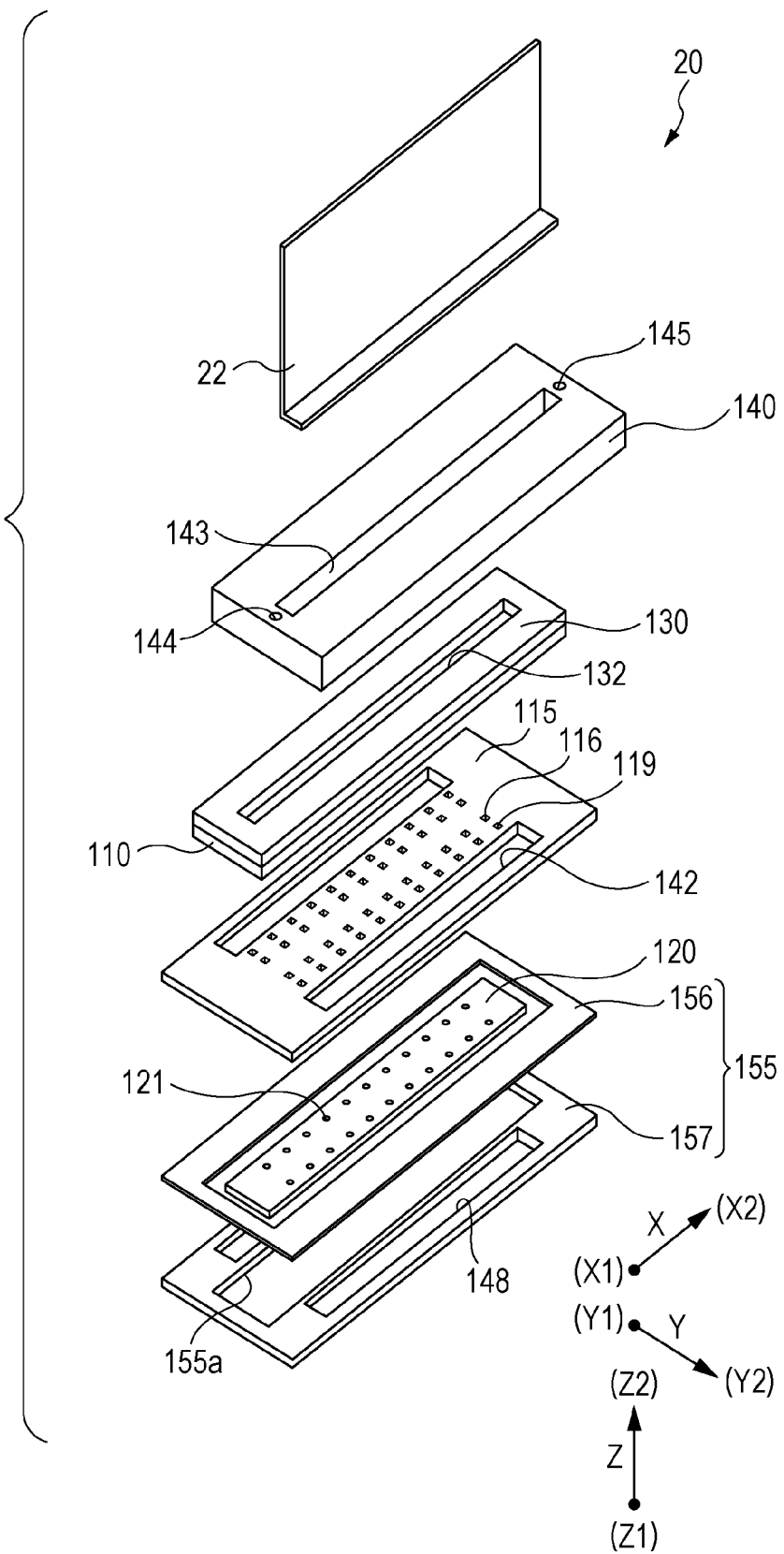
FIG. 3 is an exploded perspective view of a head main body according to the first embodiment.

Here, detailed description will be given of the head main body 20. FIG. 3 is an exploded perspective view of the head main body, and FIG. 4 is a cross-sectional diagram of the head main body.

Figure 4:
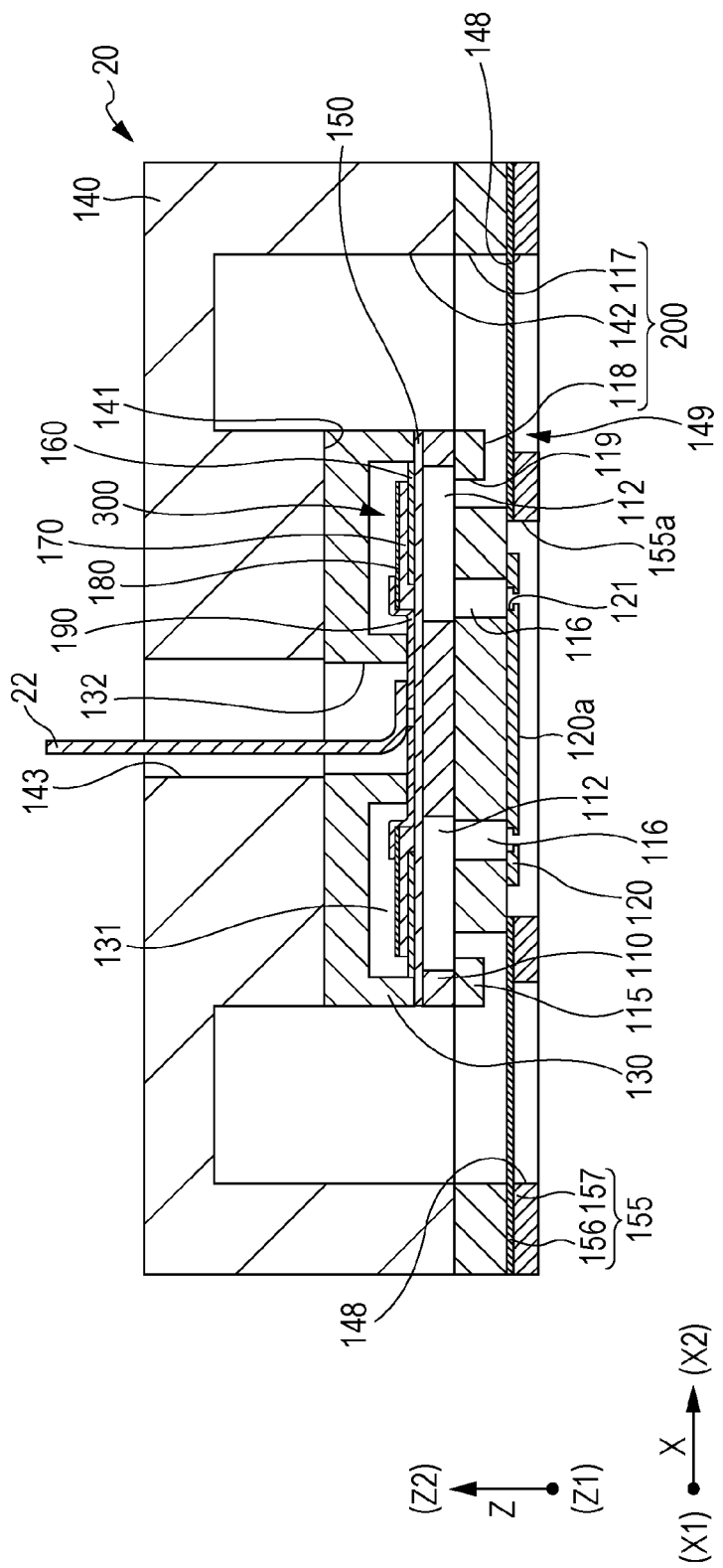
FIG. 4 is a cross-sectional diagram of the head main body according to the first embodiment.

As illustrated in FIGS. 3 and 4, the head main body 20 is provided with a plurality of members such as a flow path forming substrate 110, a communicating plate 115, a nozzle plate 120, a protective substrate 130, a case member 140, and a compliance substrate 155, the plurality of members being bonded using an adhesive or the like.

In the flow path forming substrate 110, a plurality of pressure generating chambers 112 are juxtaposed along a direction in which a plurality of nozzle openings 121 are juxtaposed. Hereinafter, this direction will be referred to as a juxtaposition direction of the pressure generating chambers 112, or as a first direction X. Plural columns in which the pressure generating chambers 112 are juxtaposed in the first direction X (two columns in the present embodiment) are provided in the flow path forming substrate 110. The direction in which the plurality of columns of the pressure generating chambers 112 are provided to line up will be referred to as a second direction Y hereinafter. The two columns in which the pressure generating chambers 112 are juxtaposed in the first direction X are disposed such that, in relation to one column of the pressure generating chambers 112, the other column of the pressure generating chamber 112 is positioned to be shifted in the first direction X by half the interval between the pressure generating chambers 112 adjacent to each other in the first direction X. Accordingly, similarly, the nozzle openings 121 (described later in detail) are also disposed to be shifted in the first direction X by half the interval between the two columns of the nozzle openings 121, and the resolution in the first direction X is doubled. Naturally, a configuration may be adopted in which the positions in the first direction X of the two columns of pressure generating chambers 112 are the same, and a different ink is supplied for each column of the pressure generating chambers 112. In the present embodiment, a direction which is perpendicular to the first direction X and the second direction Y is referred to as a third direction Z.

The communicating plate 115 is bonded to one surface in the third direction Z of the flow path forming substrate 110, that is, to the Z1 side surface. The nozzle plate 120 on which the nozzle openings 121 are provided is bonded to the Z1 side in the third direction Z of the communicating plate 115. In the present embodiment, the Z1 side of the nozzle plate 120 in the third direction Z to which the nozzle openings 121 are open is a liquid ejecting surface 120a.

Nozzle communicating paths 116 that communicate the pressure generating chambers 112 with the nozzle openings 121 are provided in the communicating plate 115. The communicating plate 115 has a larger area than that of the flow path forming substrate 110, and the nozzle plate 120 has a smaller area than that of the flow path forming substrate 110. By setting the area of the nozzle plate 120 to be comparatively small in this manner, it is possible to achieve cost reductions. Note that the "area" referred to here means the area in the in-plane directions including the first direction X and the second direction Y.

The communicating plate 115 is provided with a first manifold portion 117 and a second manifold portion 118, which configure a portion of a manifold 200.

The first manifold portion 117 is provided to penetrate the communicating plate 115 in the third direction Z. The second manifold portion 118 is provided up to part way down the third direction Z to be open to the nozzle plate 120 side, that is, to the Z1 side of the communicating plate 115 without penetrating the communicating plate 115 in the third direction Z.

The communicating plate 115 is provided with a supply communicating path 119 that communicates with one end portion of the pressure generating chamber 112 in the second direction Y independently for each of the pressure generating chambers 112. The supply communicating paths 119 communicate the second manifold portion 118 with the pressure generating chambers 112 by penetrating the communicating plate 115 in the third direction Z.

Meanwhile, a diaphragm 150 is formed on the opposite surface side of the flow path forming substrate 110 from the communicating plate 115, that is, on the Z2 side. A piezoelectric actuator 300, which is the pressure generation unit of the present embodiment, is configured by sequentially laminating a first electrode 160, a piezoelectric layer 170, and a second electrode 180 on the diaphragm 150. Generally, one of the electrodes in the piezoelectric actuator 300 is a common electrode, and the other electrode and the piezoelectric layer are patterned for each of the pressure generating chambers 112.

The protective substrate 130, which has approximately the same size as the flow path forming substrate 110, is bonded to the surface of the piezoelectric actuator 300 side, that is, of the Z2 side of the flow path forming substrate 110. The protective substrate 130 includes holding portions 131, which are spaces for protecting the piezoelectric actuators 300. Two of the holding portions 131 are formed to line up in the second direction Y, each being provided for a column of the piezoelectric actuators 300 which are juxtaposed in the first direction X. The two holding portions 131, each being provided for a column of the piezoelectric actuators 300, are provided to communicate with each other at the end portions in the first direction X of the protective substrate 130. A through hole 132 which penetrates the protective substrate 130 in the third direction Z is provided in the protective substrate 130 between the two holding portions 131 which are juxtaposed in the second direction Y. An end portion of a lead electrode 190 which is drawn out from the electrode of the piezoelectric actuator 300 is provided so as to be exposed within the through hole 132, within which the lead electrode 190 and drive wiring 22 are electrically connected.

An atmosphere-open path (not shown) which communicates the holding portions 131 with the outside is provided in the protective substrate 130. In the present embodiment, since the two holding portions 131 communicate with each other in the second direction Y, one atmosphere-open path is provided for the two holding portions 131. A configuration may be adopted in which the two holding portions 131 are provided independently without being communicated, and an atmosphere-open path is provided for each of the independent holding portions 131.

In this case, the atmosphere-open path communicates with the inner portion of the filter unit 30 via the through hole 132 and a connecting port 143 of the case member 140, and further communicates with the outside via the inner portion of the filter unit 30.

The case member 140 that partitions the manifold 200, which communicates with the plurality of pressure generating chambers 112, is fixed to the protective substrate 130 and the communicating plate 115.

The case member 140 has substantially the same shape as the communicating plate 115 described above in plan view, and is bonded to the protective substrate 130 and the communicating plate 115 described above. Specifically, the case member 140 includes a concave portion 141 on the protective substrate 130 side. The concave portion 141 is of a depth in which the flow path forming substrate 110 and the protective substrate 130 are housed. The concave portion 141 has a wider opening area than the surface of the protective substrate 130 that is joined to the flow path forming substrate 110. The opening surface of the nozzle plate 120 side of the concave portion 141 is sealed by the communicating plate 115 in a state in which the flow path forming substrate 110 and the like are housed in the concave portion 141. Accordingly, a third manifold portion 142 is formed by being partitioned by the case member 140, the protective substrate 130 and the communicating plate 115.

The compliance substrate 155 is provided on the Z1 side in the third direction Z of the communicating plate 115. The compliance substrate 155 has substantially the same size as the communicating plate 115 described above in plan view, and is provided with a first exposing opening portion 155a which exposes the nozzle plate 120. The compliance substrate 155 seals the openings of the first manifold portion 117 and the second manifold portion 118 in a state in which the nozzle plate 120 is exposed by the first exposing opening portion 155a.

In the present embodiment, the compliance substrate 155 includes a sealing film 156 and a fixing substrate 157. The sealing film 156 is formed of a flexible thin film (for example, a thin film 20 μm or less thick formed of polyphenylenesulfide (PPS) or the like) and the fixing substrate 157 is formed of a hard material such as a metal such as stainless steel (SUS). Since the region of the fixing substrate 157 opposing the manifold 200 forms an opening portion 148 that is fully removed in the thickness direction, one surface of the manifold 200 forms a compliance portion 149, which is a flexible portion that is sealed only by the flexible sealing film 156. In the present embodiment, one compliance portion 149 is provided to correspond to one manifold 200. In other words, in the present embodiment, since two manifolds 200 are provided, two compliance portions 149 are provided to interpose the nozzle plate 120 on both sides in the second direction Y.

The manifold 200 of the present embodiment is configured using the first manifold portion 117, the second manifold portion 118, and the third manifold portion 142. In the present embodiment, the manifold 200 is formed on both sides of the column of pressure generating chambers 112 to interpose the columns around the second direction Y; however, the invention is not particularly limited thereto. For example, the manifold 200 may be configured using only the third manifold portion 142, and may be configured using the second manifold portion 118 and the third manifold portion 142. However, by configuring the manifold 200 using the first manifold portion 117, the second manifold portion 118, and the third manifold portion 142, as in the present embodiment, it is possible to form the manifold 200 with as great a volume as possible without increasing the size of the recording head 10.

The connecting port 143 which communicates with the through hole 132 of the protective substrate 130 and penetrates the case member 140 in the third direction Z is provided in the case member 140. The drive wiring 22 which is inserted through the connecting port 143 is inserted through the through hole 132 to connect to the lead electrode 190.

The case member 140 is provided with an inflow path 144 and an outflow path 145. The inflow path 144 communicates with the manifold 200 and supplies the ink to the manifold 200, and the outflow path 145 communicates with the manifold 200 and allows the ink within the manifold 200 to flow out. In this case, the inflow path 144 is provided on one side in the first direction X of the column of the pressure generating chambers 112, and the outflow path 145 is provided on the other side in the first direction X of the column of the pressure generating chambers 112. The inflow path 144 and the outflow path 145 are each communicated with the two manifolds 200, and the inflow path 144 to which the same ink is supplied is split part way to supply the same ink to the two manifolds 200 (not particularly shown). The outflow paths 145 communicating with each of the manifolds 200 join together part way and the ink in the manifolds 200 flows out from one exit (not particularly shown). Naturally, a configuration may be adopted in which the inflow paths 144 are provided independently for each of the manifolds 200 without splitting part way, and a configuration may be adopted in which the outflow paths 145 are provided independently for each of the manifolds 200 without joining part way.

In this case, a cover head 23 (refer to FIG. 1) which protects the head main body 20 with the nozzle openings 121 in an exposed state is fixed to the liquid ejecting surface 120a of the head main body 20. The cover head 23 is bonded to the compliance substrate 155. Therefore, a space is formed between the cover head 23 and the opening portion 148. When the space is sealed, the compliance portion 149 cannot flexibly deform due to the gas in the space being unable to move. Therefore, it is necessary to communicate the space, which forms the compliance portion 149 and is formed between the opening portion 148 and the cover head 23, with the outside to open the space to the atmosphere; however, it is not preferable to provide the atmosphere-open port in the cover head 23 to open the cover head 23 to the ejecting target medium side. This is because there is a concern that the ink will enter the space via the atmosphere-open port from the ejecting target medium, adhere to the sealing film 156 or the like, and the compliance portion 149 will stop functioning. Therefore, in the present embodiment, a configuration is adopted in which the atmosphere-open path which communicates the space between the opening portion 148 and the cover head 23 is provided to penetrate the compliance substrate 155, the communicating plate 115, the flow path forming substrate 110 and the like in the third direction Z so as to be open to the opposite side from the flow path forming substrate 110 of the protective substrate 130, that is, to the Z2 side (not particularly shown in the drawings).

In this case, the head main body 20 is fixed to the surface of the Z1 side, which is the liquid ejecting surface 120a side in the third direction Z of the filter unit 30, using two screw members 24 which are screwed into the filter unit 30.

There are no particular limitations to the materials of the various members configuring the filter unit 30; however, in the present embodiment the members are formed of resin materials.

Figure 5:
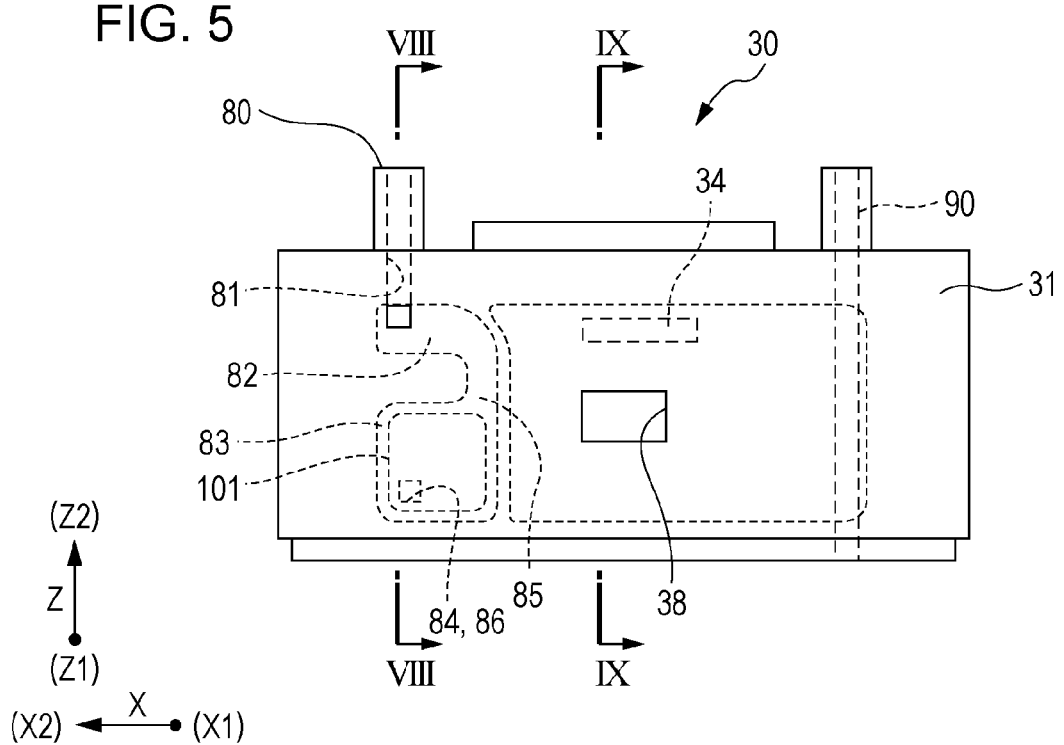
FIG. 5 is a front view of the recording head according to the first embodiment.
Figure 6:
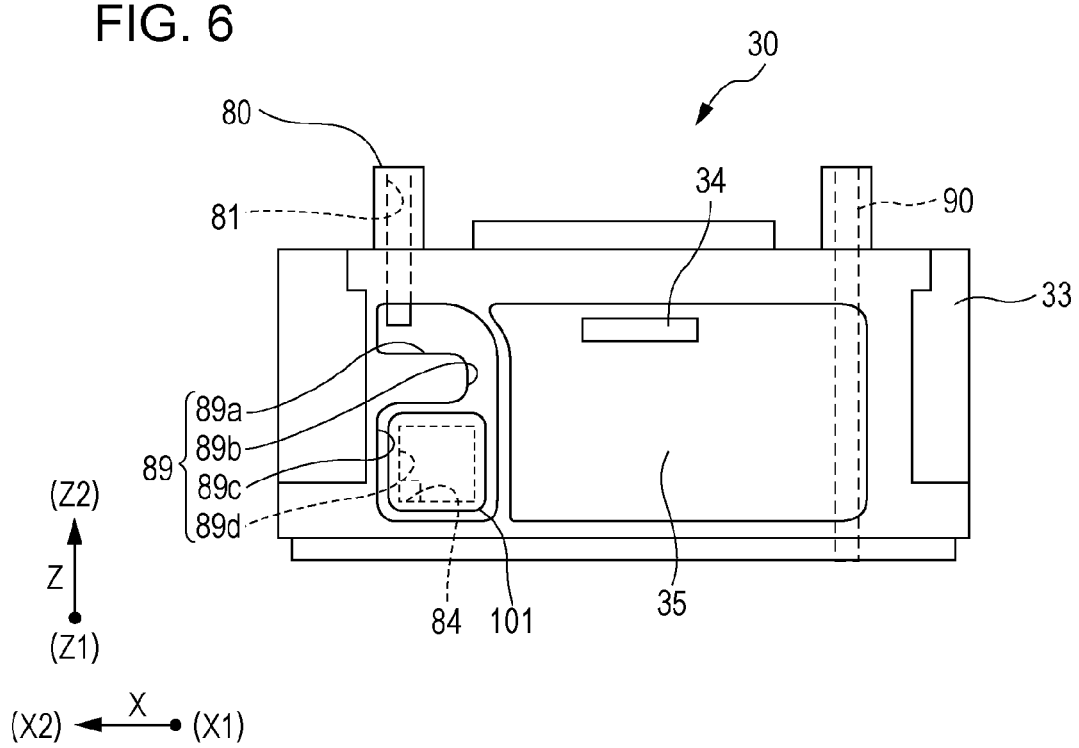
FIG. 6 is a front view of a filter unit main body according to the first embodiment.
Figure 7:
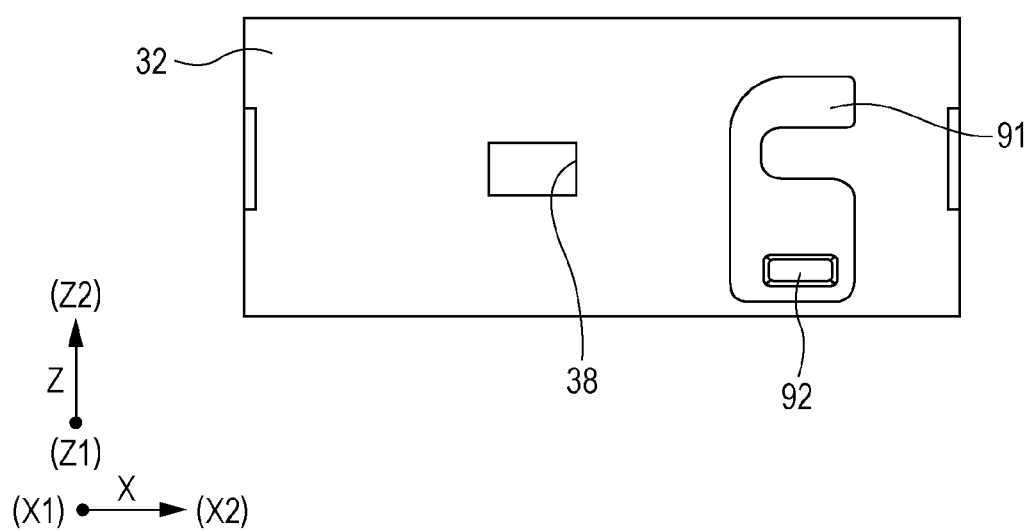
FIG. 7 is a front view of a second cover member according to the first embodiment.
Figure 8:
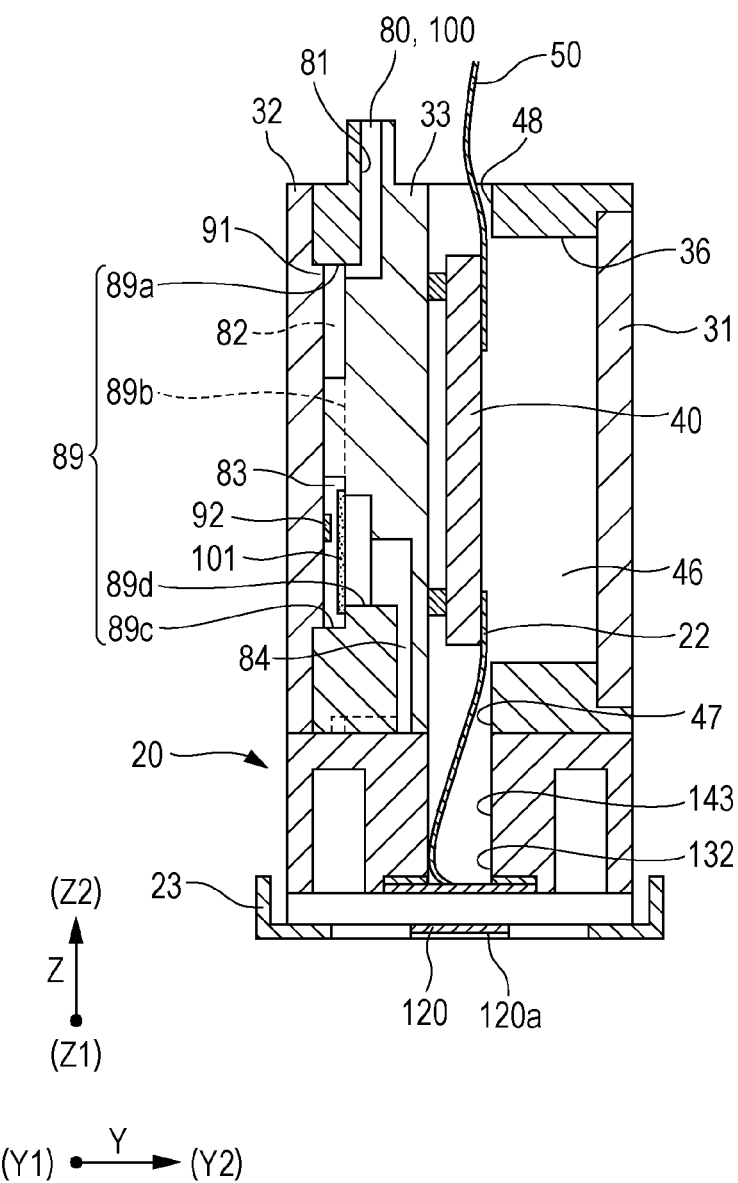
FIG. 8 is a cross-sectional diagram taken along the line VIII-VIII of FIG. 5.
Figure 9:
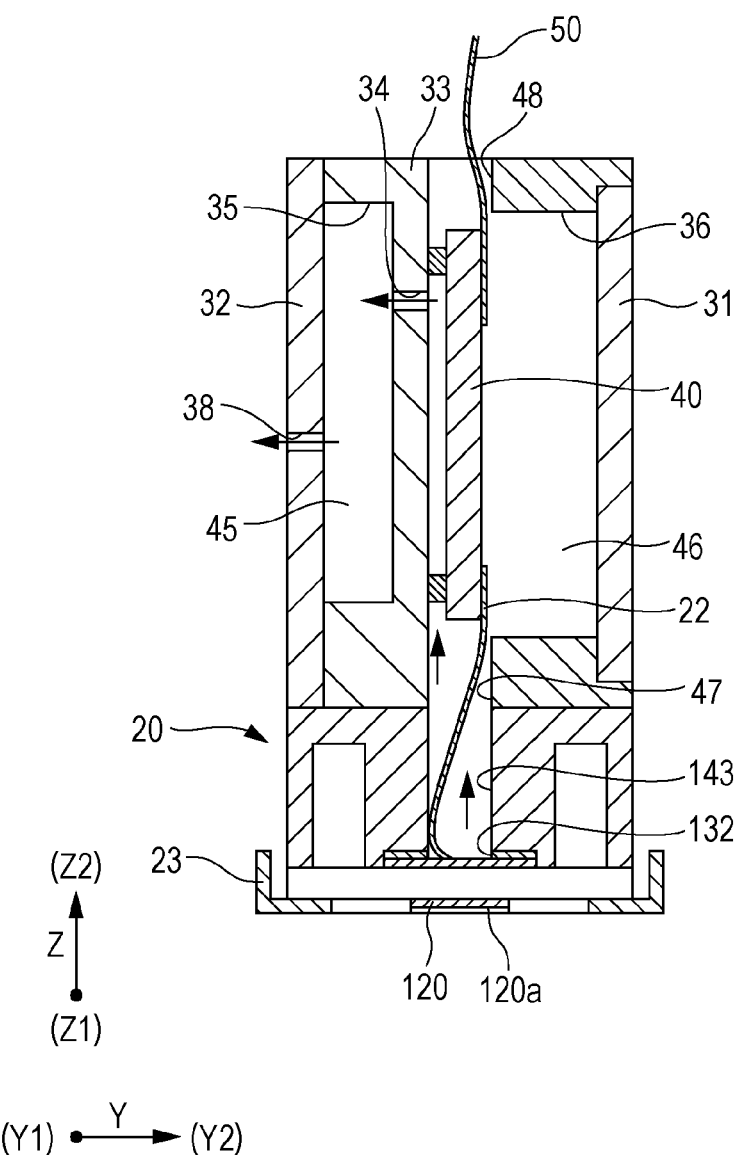
FIG. 9 is a cross-sectional diagram taken along the line IX-IX of FIG. 5.

Here, detailed description will be given of the other members used to configure the recording head according to the present embodiment, with further reference to FIGS. 5 to 9. FIG. 5 is a front view of the recording head according to the first embodiment, FIG. 6 is a front view of the filter unit main body according to the first embodiment, FIG. 7 is a front view of the second cover member according to the first embodiment, FIG. 8 is a cross-sectional diagram taken along the line VIII-VIII of FIG. 5, and FIG. 9 is a cross-sectional diagram taken along the line IX-IX of FIG. 5.

The filter unit 30 includes a filter unit main body 33, and a first cover member 31 and a second cover member 32 are provided on each side (in the second direction Y in the present embodiment) of the filter unit main body 33. The filter unit main body 33 is an example of the first member, and the second cover member 32 is an example of the second member.

A liquid flow path 100 which supplies the ink from a liquid storage unit (not shown), in which the ink is stored as the liquid, to the head main body 20 and collects the ink from the head main body 20 in the liquid storage unit is provided in the filter unit 30. The liquid flow path 100 according to the present embodiment is provided with a supply flow path 80 and a collection flow path 90, which are provided in the filter unit 30. The supply flow path 80 is an outgoing path which supplies the ink from the liquid storage unit to the head main body 20, and is provided to communicate with the inflow path 144 of the head main body 20. The collection flow path 90 is a return path which collects the ink from the head main body 20 in the liquid storage unit, and is provided to communicate with the outflow path 145 of the head main body 20.

The supply flow path 80 is provided on one end portion side (the X2 side in the present embodiment) in the first direction X of the filter unit 30, and includes an ink introduction port 81, a first flow path 82, a filter chamber 83, and a second flow path 84. The ink introduction port 81 is connected to the liquid storage unit either directly or via a tube or the like, the first flow path 82 communicates with the ink introduction port 81, the filter chamber 83 is connected to the first flow path 82, and the second flow path 84 connects the filter chamber 83 to the head main body 20.

A groove portion 89 is formed to be open to the side (the surface of the second cover member 32 side) of the filter unit main body 33. The groove portion 89 is provided with a groove portion 89*a* and a groove portion 89*b*, which form the side of the first flow path 82, a groove portion 89*c*, which forms the side and bottom of the filter chamber 83, and a groove portion 89*d*, which is open to the bottom of the groove portion 89*c*.

The widths of the groove portion 89*a* and the groove portion 89*c* in the X direction are approximately the same, and the width of the groove portion 89*b* is narrower than that of the groove portion 89*a* and the groove portion 89*c* (refer to FIG. 5). One opening of the first flow path 82 shows on the bottom of the groove portion 89*a*, and the groove portion 89*a* communicates with the first flow path 82. One opening of the second flow path 84 shows on the bottom of the groove portion 89*d*, and the groove portion 89*d* communicates with the second flow path 84.

The groove portion 89 of the filter unit main body 33 is sealed by the second cover member 32; thus, the first flow path 82 and the filter chamber 83 are formed. Specifically, the first flow path 82 is formed by the groove portion 89*a*, the groove portion 89*b*, and the second cover member 32, and the filter chamber 83 is formed by the groove portion 89*c*, the groove portion 89*d*, and the second cover member 32.

Here, the portion of the boundary between the filter chamber 83 and the first flow path 82 is a supply port 85 which acts as the entrance for the ink which is supplied to the filter chamber 83. In the present embodiment, the portion of the boundary between the groove portion 89*b* and the groove portion 89*c* is the supply port 85. Furthermore, the portion of the boundary between the filter chamber 83 and the second flow path 84 is a discharge port 86 of the ink which is discharged from the filter chamber 83. In the present embodiment, the portion of the boundary between the groove portion 89*d* and the second flow path 84 which is open to the groove portion 89*d* is the discharge port 86.

In this manner, the supply flow path 80, which is formed of the ink introduction port 81, the first flow path 82, the supply port 85, the filter chamber 83, the discharge port 86, and the second flow path 84, is formed in the filter unit 30.

A filter 101 for removing foreign matter such as dirt and bubbles contained in the ink is provided in the filter chamber 83. Specifically, the filter 101 is disposed to cover the opening of the groove portion 89*d* which is configured to form the filter chamber 83. The ink which is supplied to the filter chamber 83 passes through the filter 101 and is supplied to the inflow path 144 of the head main body 20 via the second flow path 84.

In this case, the filter 101 is for removing foreign matter such as dirt and bubbles contained in the ink, which is the liquid. For example, for the filter 101, it is possible to use a sheet shaped filter in which a plurality of fine pores are formed by closely weaving fibers of a material such as metal or resin, or to use a filter in which a plate-shaped member of a material such as metal or resin is penetrated with a plurality of fine pores. A nonwoven fabric or the like may be used for the filter 101, and the material thereof is not particularly limited.

The method of fixing the filter 101 to the filter unit main body 33 is not particularly limited; however, it is preferable to thermally weld the filter 101 to a rib 102. Accordingly, in comparison to a case in which the filter 101 is formed integrally to be interposed between two members (members which correspond to the second cover member 32 and the filter unit main body 33 in the invention), it is possible to simplify the manufacturing process by merit of a mold being unnecessary.

Since the groove portion 89*c* is of a size large enough to house the filter 101, even when the molten resin flows to the filter 101 side during the thermal welding of the filter 101 onto the rib 102, it is possible to use as much of the filter 101 as possible.

A sealing portion 91, which protrudes toward the filter unit main body 33, is formed on the second cover member 32 on the surface of the filter unit main body 33 side. The sealing portion 91 of the second cover member 32 seals the opening of the groove portion 89; thus, the first flow path 82 and the filter chamber 83 are formed by partitioning (described in detail later). Furthermore, a protruding portion 92 is provided on the second cover member 32 in a region opposing the filter 101. The protruding portion 92 will be described in detail later.

Meanwhile, the collection flow path 90 is provided in the filter unit 30 on the other end portion side, that is, the X2 side opposing the supply flow path 80 in the first direction X, and is provided to penetrate the surfaces of the Z1 side, which is the liquid ejecting surface 120*a* side in the third direction Z, and the Z2 side which opposes the Z1 side.

The filter unit main body 33 is provided with a first concave portion 35 and a second concave portion 36. The first concave portion 35 is open to one surface side in the second direction Y, and the second concave portion 36 is open to the other surface side in the second direction Y. The first concave portion 35 and the second concave portion 36 are partitioned by a partitioning wall portion 37.

The opening of the first concave portion 35 of the filter unit main body 33 is covered by the second cover member 32, and a first space portion 45 is formed between the first concave portion 35 and the second cover member 32.

The opening of the second concave portion 36 is covered by the first cover member 31, and a second space portion 46 is formed between the second concave portion 36 and the first cover member 31.

The circuit board 40 is held within the second space portion 46. A communicating hole 47 which communicates the second space portion 46 with the surface of the Z1 side is provided on the head main body 20 side, that is, the Z1 side of the filter unit main body 33. The drive wiring 22 of the head main body 20 is inserted through the communicating hole 47 and is connected to the circuit board 40 within the second space portion 46.

An external wiring connection hole 48 which communicates the second space portion 46 with the outside is provided on the Z2 side of the filter unit main body 33. The wiring substrate 50 is inserted through the external wiring connection hole 48 and is connected to the circuit board 40 within the second space portion 46. Note that, the external wiring connection hole 48 is sealed by the seal member (not shown). Accordingly, intrusion of the ink from the external wiring connection hole 48 is suppressed.

A print signal from an external control circuit or the like is supplied to the piezoelectric actuators 300 as the drive signal via the wiring substrate 50, the circuit board 40, and the drive wiring 22. The circuit board 40 is formed of a printed circuit board, on which electronic components, wiring and the like (not shown) are provided. For example, the circuit board 40 may be either a flexible substrate or a rigid substrate, or a compound substrate formed by combining these. In the present embodiment, a rigid substrate is used for the circuit board 40.

Since the atmosphere-open path of the head main body 20 described above communicates with the connecting port 143, the atmosphere-open path communicates with the second space portion 46 via the communicating hole 47 of the filter unit main body 33 which communicates with the connecting port 143.

A connecting path 34 which communicates the first space portion 45 with the second space portion 46 is provided in the partitioning wall portion 37 which partitions the first concave portion 35 and the second concave portion 36. Accordingly, the atmosphere-open path, which communicates with the second space portion 46, communicates with the first space portion 45 via the connecting path 34.

The second cover member 32 is provided with an atmosphere-open port 38. The atmosphere-open port 38 penetrates the second cover member 32 and communicates the first space portion 45 with the outside. In other words, the atmosphere-open path of the head main body 20 communicates with the second space portion 46 via the communicating hole 47, and the second space portion 46 communicates with the first space portion 45 via the connecting path 34. The first space portion 45 is communicated with the outside by the atmosphere-open port 38. In other words, the atmosphere-open path of the head main body 20 is open to the atmosphere due to the communicating hole 47, the second space portion 46, the connecting path 34, the first space portion 45, and the atmosphere-open port 38.

In the recording head 10 of the present embodiment, the ink is drawn from the liquid storage unit (not shown) into the flow path of the inner portion of the head main body 20 via the supply flow path 80 of the filter unit 30 and the inner portion is filled with the ink until the ink reaches the nozzle openings 121; subsequently, ink droplets are discharged from the nozzle opening by driving the piezoelectric actuators 300 according to the recording signal from a drive circuit or the like. The ink which is introduced to the flow path of the inner portion of the head main body 20 is returned to the liquid storage unit via the collection flow path 90 of the filter unit 30. In other words, the ink of the liquid storage unit is supplied to the inner portion of the head main body 20 via the supply flow path 80 and is collected in the liquid storage unit via the collection flow path 90 from the inner portion of the head main body 20 such that so-called circulation is performed.

Figure 10:
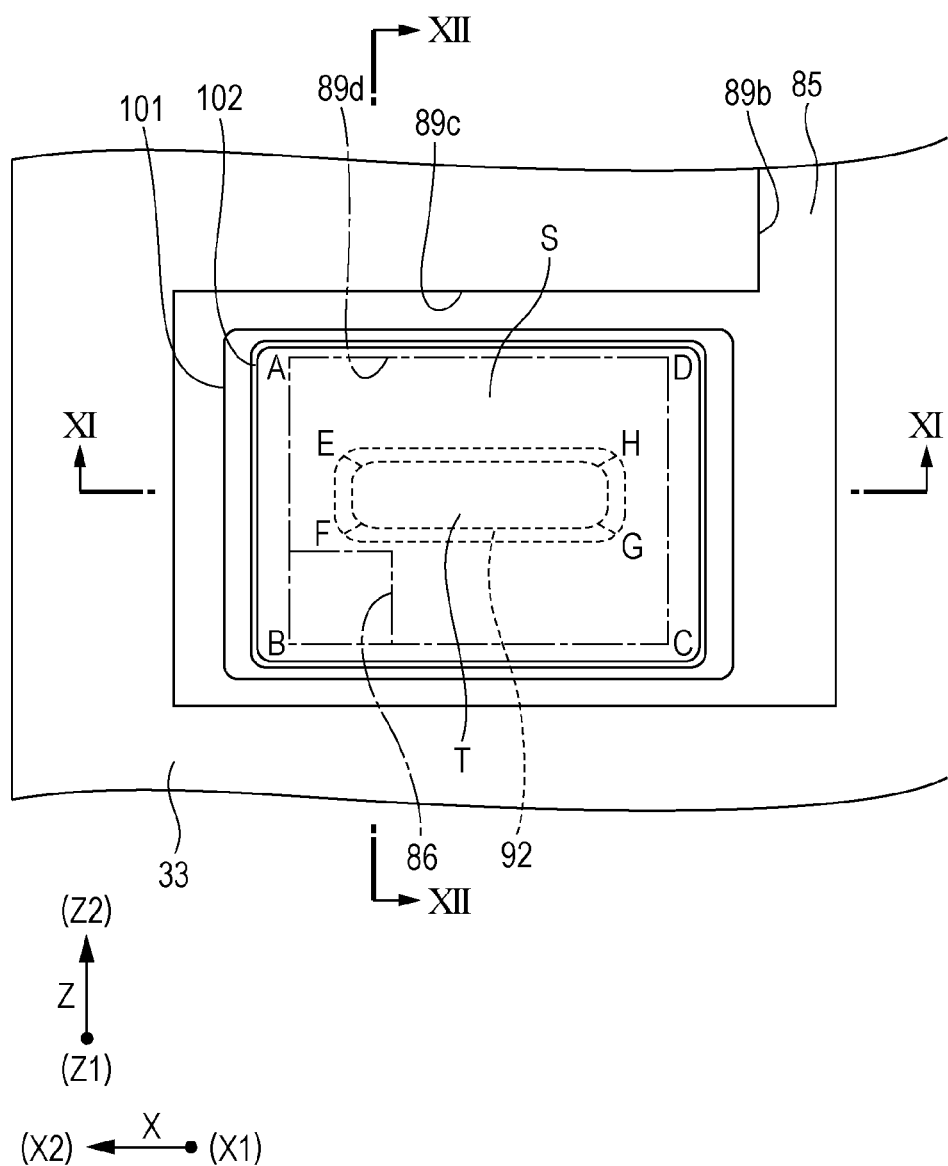
FIG. 10 is an enlarged front view of the main components of a filter unit.
Figure 11:
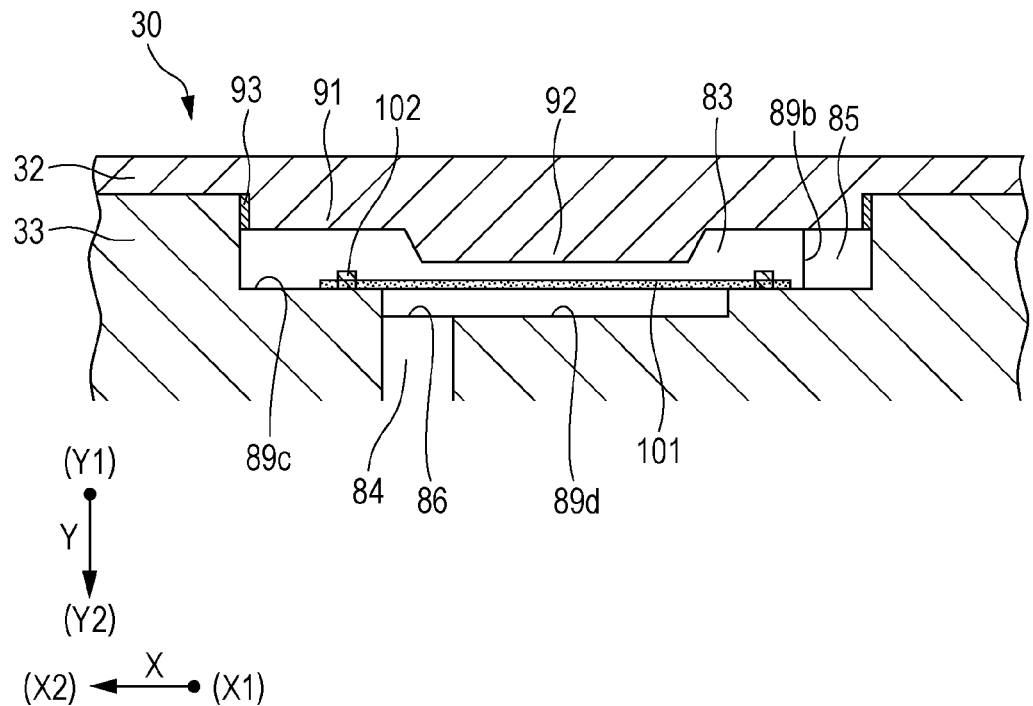
FIG. 11 is a cross-sectional diagram taken along the line XI-XI of FIG. 10.
Figure 12:
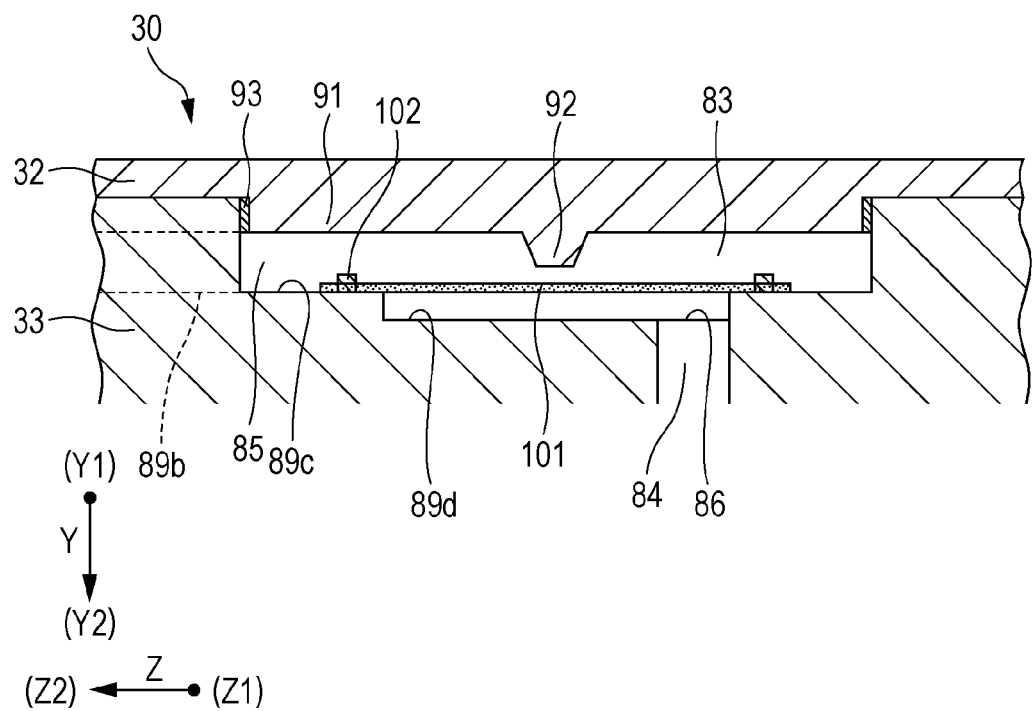
FIG. 12 is a cross-sectional diagram taken along the line XII-XII of FIG. 10.

Here, detailed description will be given of the protruding portion 92 which is formed in the filter chamber 83. FIG. 10 is an enlarged front view of the main components of the filter unit, FIG. 11 is a cross-sectional diagram taken along the line XI-XI of FIG. 10, and FIG. 12 is a cross-sectional diagram taken along the line XII-XII of FIG. 10. In FIG. 10, depiction of the second cover member 32 is omitted, the protruding portion 92 is indicated by dotted lines, and the groove portion 89d and the discharge port 86 are indicated by dot-and-dash lines.

As described above, the sealing portion 91, which protrudes toward the filter unit main body 33, is formed on the second cover member 32 on the surface of the filter unit main body 33 side. The planar shape of the sealing portion 91 is formed to be approximately the same as the opening shape of the groove portion 89, and the top surface of the sealing portion 91 (the surface which opposes the filter unit main body 33) is formed to have a substantially flat shape. When the second cover member 32 is bonded to the filter unit main body 33, the sealing portion 91 is inserted into the groove portion 89. In other words, the sealing portion 91 of the second cover member 32 seals the opening of the groove portion 89 and partitions the first flow path 82 and the filter chamber 83.

The invention is not particularly limited to an aspect in which the second cover member 32 is bonded to the filter unit main body 33; however, in the present embodiment the two components are bonded using a sealant 93. The sealant 93 is provided between the opposing surfaces of the second cover member 32 and the filter unit main body 33, and the space between the inner surface of the groove portion 89 and the sides of the sealing portion 91 is also filled with the sealant 93.

Accordingly, since the gap between the inner surface of the groove portion 89 and the sides of the sealing portion 91 is filled with the sealant 93, it is possible to suppress the intrusion of bubbles into the gap. Here, when pressurized filling of the ink is carried out, the pressurized ink is supplied to the filter chamber 83 (from the side which is further upstream than the filter 101) via the supply port 85. At this time, there is a case in which the bubbles contained in the ink do not pass through the filter 101 and are pushed to the peripheral edge portion of the filter chamber 83. At this time, when a gap is formed between the inner surface of the groove portion 89 and the sides of the sealing portion 91, the bubbles deeply enter the gap due to the ink pressure, and it is difficult to remove such bubbles.

However, in the filter unit 30 according to the present embodiment, by filling the gap with the sealant 93, it is possible to suppress the retention of bubbles in the gap of the filter chamber 83 even when carrying out the pressurized filling of the ink.

The rib 102, which protrudes to the second cover member 32 side and surrounds the peripheral edge of the opening of the groove portion 89d provided in the filter unit main body 33, is provided on the peripheral edge of the opening. The shape of the rib 102 is smaller than that of the filter 101.

The filter 101 is mounted on the rib 102 and thermally welded thereto. The rib 102 is melted and is essentially integral with the filter 101. By thermally welding the filter 101 to the rib 102, it is possible to firmly fix the filter 101 to the filter unit main body 33.

The protruding portion 92 is provided on the second cover member 32 in a region opposing the filter 101. In the present embodiment, the protruding portion 92 is formed on the top surface of the sealing portion 91 in a trapezoidal shape which protrudes to the filter 101 side. In plan view in relation to the filter 101 (refer to FIG. 10), the protruding portion 92 is disposed to be contained on the inside of the filter 101 and to be contained on the inside of the rib 102.

Here, in plan view, a region which forms a portion of the filter 101 and covers the opening shape of the liquid flow path further downstream than the filter 101 within the liquid flow path 100 is referred to as the effective region of the filter 101. In the present embodiment, the liquid flow path on the downstream side of the filter 101 is a flow path which is formed by being partitioned by the groove portion 89d. Therefore, an effective region S of the filter 101 is a region which covers the opening shape of the groove portion 89d of the filter 101 (the rectangular region indicated by the points A, B, C, and D).

In plan view, the area of a region T (the region indicated by the points E, F, G, and H) which opposes the filter of the protruding portion 92 is smaller than that of the effective region S.

The protruding portion 92 is positioned between the supply port 85 and the discharge port 86 in plan view. In other words, the protruding portion 92 is positioned on (overlapping) a virtual straight line joining the supply port 85 and the discharge port 86.

When one of the conditions relating to the protruding portion 92 described above is satisfied; in other words, the protruding portion 92 is disposed between the supply port 85 and the discharge port 86 in plan view, the area of the region T opposing the filter of the protruding portion 92 is smaller than the area of the effective region S, the protruding portion 92 is contained inside the filter 101 in plan view in relation to the filter 101, or the protruding portion 92 is disposed so as to be contained inside the rib 102, it is possible to suppress the retention of bubbles even if the filter chamber 83 is filled with the pressurized ink.

Figure 13:
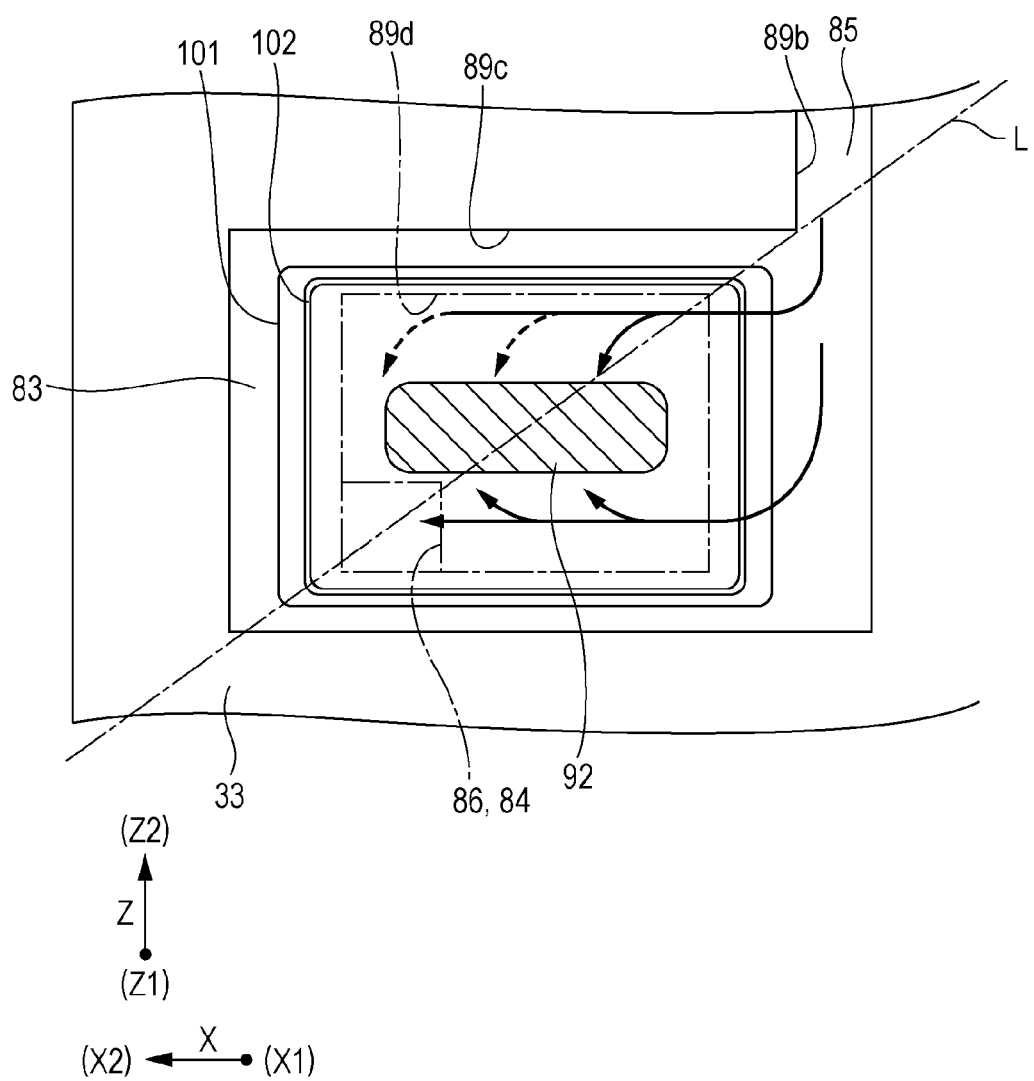
FIG. 13 is a front view illustrating the flow of ink in a filter chamber.

This is illustrated using FIG. 13. FIG. 13 is a front view illustrating the flow of the ink in the filter chamber 83.

First, for the flow of the ink, the ink flows from the supply port 85 into the filter chamber 83, passes through the filter 101 (the effective region S illustrated in FIG. 10), flows into the groove portion 89d, and flows into the discharge port 86. Hypothetically, if the protruding portion 92 is not present, a state is assumed in which the flow of the ink along a virtual straight line L joining the supply port 85 and the discharge port 86 is the fastest, and in locations distanced from the straight line L, the ink is slower or stops flowing. Therefore, in locations distanced from the straight line L within the effective region S of the filter 101, the ink is retained, and in the vicinity of the straight line L, the ink passes through the filter 101.

As a result, in locations distanced from the straight line L in the filter chamber 83 (closer to the upstream side of the filter chamber 83 than the filter 101), particularly in the corners of the filter chamber 83, there is a likelihood that bubbles will be retained.

However, in the present embodiment, in plan view, the protruding portion 92 is positioned between the supply port 85 and the discharge port 86 in the filter chamber 83, that is, on the straight line L. The protruding portion 92 restricts the height (the Y direction) of the filter chamber 83 (refer to FIGS. 11 and 12). In other words, the interval between the second cover member 32 and the filter 101 is reduced. Since the flow path resistance increases in the interval, the ink does not flow easily, and as shown using arrows in FIG. 13, a flow which bypasses the protruding portion 92 is generated.

Accordingly, in the regions distanced from the proximity of the straight line L in the filter chamber 83, it is possible to cause the ink to flow at a higher speed than when the protruding portion 92 is not provided. As a result, in locations distanced from the straight line L in the filter chamber 83 (closer to the upstream side of the filter chamber 83 than the filter 101), particularly in the corners of the filter chamber 83, it is possible to suppress the retention of bubbles.

Therefore, according to the filter unit 30 according to the present embodiment, it is possible to suppress the retention of bubbles in the filter chamber 83 when pressurized filling of the ink is carried out. In relation to the recording head 10 to which the ink is supplied by the filter unit 30, it is possible to reduce the likelihood of the bubbles being unintentionally discharged during the printing or the like, and the nozzle openings 121 being clogged by the bubbles. Since the retention of bubbles in the filter chamber 83 when carrying out pressurized filling of the ink is suppressed, the recording head 10 provided with the filter unit 30 according to the present embodiment is capable of reducing the likelihood of the bubbles being supplied from the filter unit 30 during printing or the like and the nozzle openings 121 being clogged by the bubbles. Accordingly, the recording head 10 with improved reliability is provided.

The protruding portion 92 is contained inside of the filter 101 in plan view in relation to the filter 101. In this case, in regard to the interval between the filter 101 and the second cover member 32, both a portion in which the height of the filter chamber 83 is restricted by the protruding portion 92 and a portion in which the height is not restricted by the protruding portion 92 are always formed. Accordingly, it is possible to cause the ink which bypasses the protruding portion 92 as illustrated, to flow more reliably.

The protruding portion 92 is disposed to be contained inside of the rib 102 in plan view. In other words, as illustrated in FIGS. 11 and 12, the protruding portion 92 is not present on the outside of the rib 102. Therefore, on the outside of the rib 102 of the filter chamber 83, the surface of the second cover member 32 on the filter unit main body 33 side is flat, and no protrusions are present. Accordingly, on the outside of the rib 102 of the filter chamber 83, since there is no restriction by the protruding portion 92, it is possible to secure a greater height in the Y direction, and it is possible to suppress the pushing of the bubbles to the outside of the rib 102 of the filter chamber 83 when carrying out the pressurized filling of the ink.

The second cover member 32 is provided with the sealing portion 91. Since the sealing portion 91 is inserted into the groove portion 89c, it is also possible to adjust the height in the Y direction of the filter chamber 83 by setting the height of the sealing portion 91. Accordingly, it is possible to adjust the flow speed of the ink of the filter chamber 83. It is not necessary to provide the second cover member 32 with the sealing portion 91, and a configuration may be adopted in which the groove portion 89c is blocked by a plate shaped member and the protruding portion 92 is provided on the member.

Figure 14:
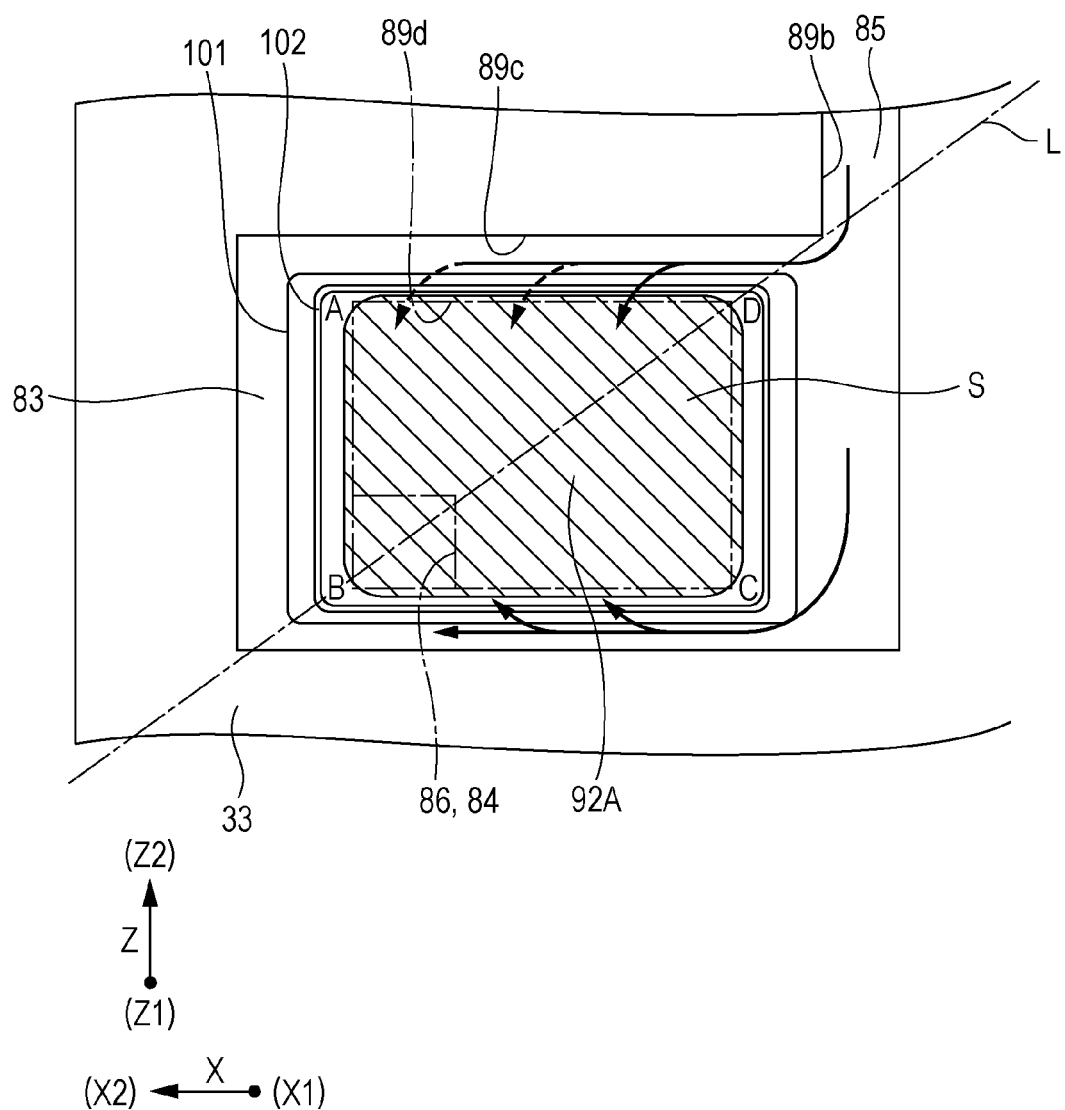
FIG. 14 is a front view illustrating the flow of the ink according to a modification example.

Another protruding portion which satisfies the above conditions will be exemplified. FIG. 14 is a front view illustrating the flow of the ink in the filter chamber according to a modification example. The same reference numerals will be assigned to components which are similar to those in FIGS. 10 to 13, and redundant description thereof will be omitted.

As illustrated in FIG. 14, a protruding portion 92A is disposed in the space of the virtual straight line L which joins the supply port 85 and the discharge port 86 in plan view, that is, to overlap the straight line L in the same manner as the example illustrated in FIG. 13. The protruding portion 92A is larger than the opening shape of the groove portion 89d which is covered by the filter, and the protruding portion 92A covers the entire groove portion 89d.

In this manner, the protruding portion 92A is formed larger than the entire groove portion 89d and covers the entire groove portion 89d; thus, the flow path resistance of the entire gap between the effective region S of the filter 101 and the protruding portion 92A increases, and it is considered that the ink will not easily enter the gap. However, as shown using arrows in FIG. 14, first, the ink passes through the peripheral edge of the filter chamber 83 at a high speed so as to bypass the protruding portion 92A, and passes through the filter 101 (the effective region S).

Therefore, since it is possible to increase the flow speed of the ink even in regions distanced from the straight line L of the filter chamber 83, it is possible to suppress the retention of bubbles during the pressurized filling of the ink.

Figure 15:
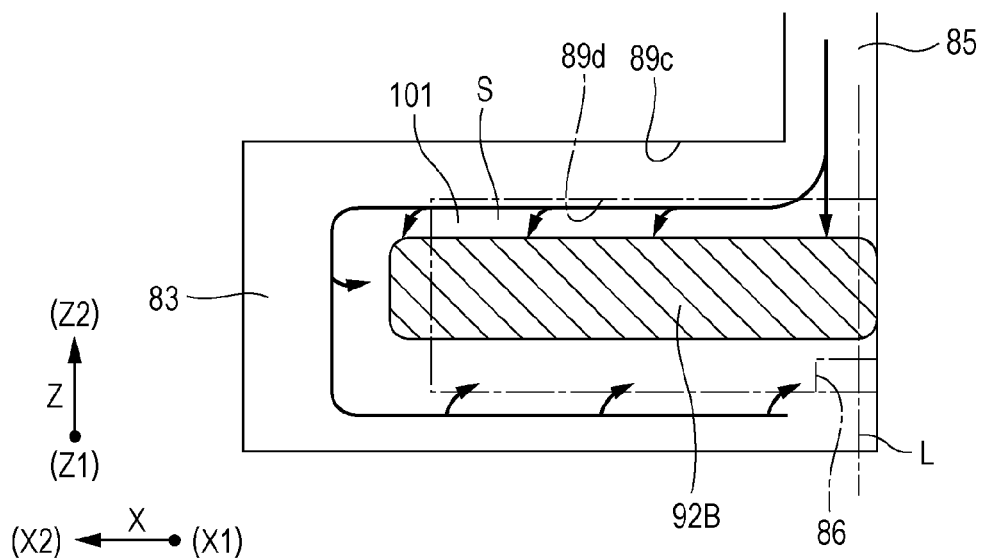
FIG. 15 is a front view illustrating the flow of the ink according to a modification example.

Yet another protruding portion which satisfies the above conditions will be exemplified. FIG. 15 is a front view illustrating the flow of the ink in the filter chamber according to a modification example. The same reference numerals will be assigned to components which are similar to those in FIGS. 10 to 13, and redundant description thereof will be omitted. In FIG. 15, only the portion of the filter 101 which covers the opening of the groove portion 89d, that is, only the effective region S is illustrated.

As illustrated in FIG. 15, in the present modification example, the supply port 85 and the discharge port 86 are not disposed on the diagonal line of the filter chamber 83, and are disposed along the Z direction. Meanwhile, in the protruding portion 92B, one end of the X1 side contacts the side of the filter chamber 83, and the other end of the X2 side has a shape provided to extend to the X2 side in the X direction.

In the protruding portion 92B, one end of the X1 side is disposed in the space of the virtual straight line L which joins the supply port 85 and the discharge port 86 in plan view, that is, to overlap the straight line L.

Even in the case of the protruding portion 92B, as shown using arrows in FIG. 15, first, the ink passes through the peripheral edge of the filter chamber 83 at a high speed so as to bypass the protruding portion 92B, and passes through the filter 101 (the effective region S).

Therefore, since it is possible to increase the flow speed of the ink flowing through the periphery of the filter chamber 83 by disposing the protruding portion 92B between the supply port 85 and the discharge port 86, even when the protruding portion 92B is disposed along the Z direction, for example, without the supply port 85 and the discharge port 86 being disposed on the diagonal line of the filter chamber 83, it is possible to suppress the retention of bubbles during the pressurized filling of the ink.

Figure 16:
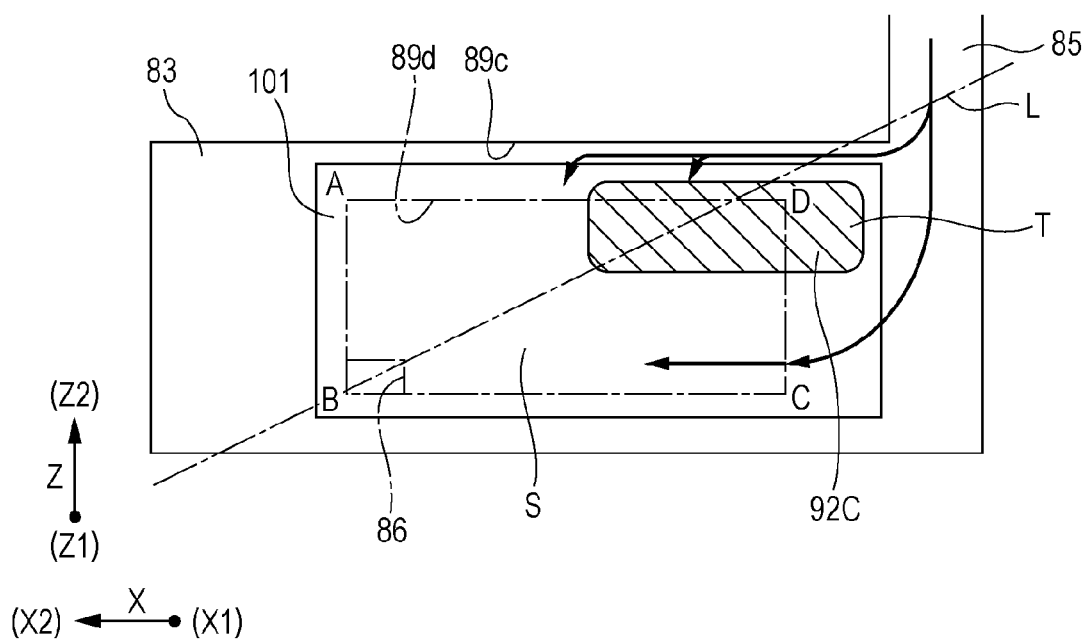
FIG. 16 is a front view illustrating the flow of the ink according to a modification example.

Yet another protruding portion which satisfies the above conditions will be exemplified. FIG. 16 is a front view illustrating the flow of the ink in the filter chamber according to a modification example. The same reference numerals will be assigned to components which are similar to those in FIGS. 10 to 13, and redundant description thereof will be omitted.

As illustrated in FIG. 16, in the present modification example, a protruding portion 92C is disposed in the space of the virtual straight line L which joins the supply port 85 and the discharge port 86 in plan view, that is, to overlap the straight line L. The protruding portion 92C is disposed inside of the filter 101 in plan view. In other words, the region T which opposes the filter 101 of the protruding portion 92C is the region of the protruding portion 92C itself.

The area of the region T which opposes the filter 101 of the protruding portion 92C is smaller than the area of the effective region S filter 101 in plan view. In other words, this means that the protruding portion 92C is not large enough to cover the entire effective region S of the filter 101.

Even in the case of the protruding portion 92C, as shown using arrows in FIG. 16, first, the ink passes through the peripheral edge of the filter chamber 83 at a high speed so as to bypass the protruding portion 92C, and passes through the filter 101 (the effective region S). In this manner, since it is possible to increase the flow speed of the ink flowing through the periphery of the filter chamber 83, it is possible to suppress the retention of bubbles during the pressurized filling of the ink.

Other Embodiment

The invention is not limited to the embodiment described above and may be modified insofar as the modifications are within the scope of the invention. For example, the protruding portion 92 has a trapezoidal shape; however the invention is not limited thereto. A rectangular protruding portion, a protruding portion including a curved surface, a protruding portion including a tapered surface, or a protruding portion with stepped sides may be adopted. The number of protruding portions is not limited to one, and a plurality may be provided.

The protruding portion 92 is formed on the second cover member 32; however, the invention is not limited to such an aspect, and the protruding portion 92 may be provided on the filter unit main body 33 side. In this case, on the outside of the groove portion 89d which is covered by the filter 101, a protruding portion which protrudes to the second cover member side is provided, and the protruding portion is disposed between the supply port 85 and the discharge port 86. In this case, the filter unit main body corresponds to the second member of an aspect of the invention, and the second cover member corresponds to the first member of an aspect of the invention.

The supply port 85 which is formed in the filter chamber 83 supplies the ink from the Z direction in relation to the filter chamber 83; however, the direction of the ink which is supplied to the filter chamber 83 from the supply port 85 is not particularly limited.

Figure 17:
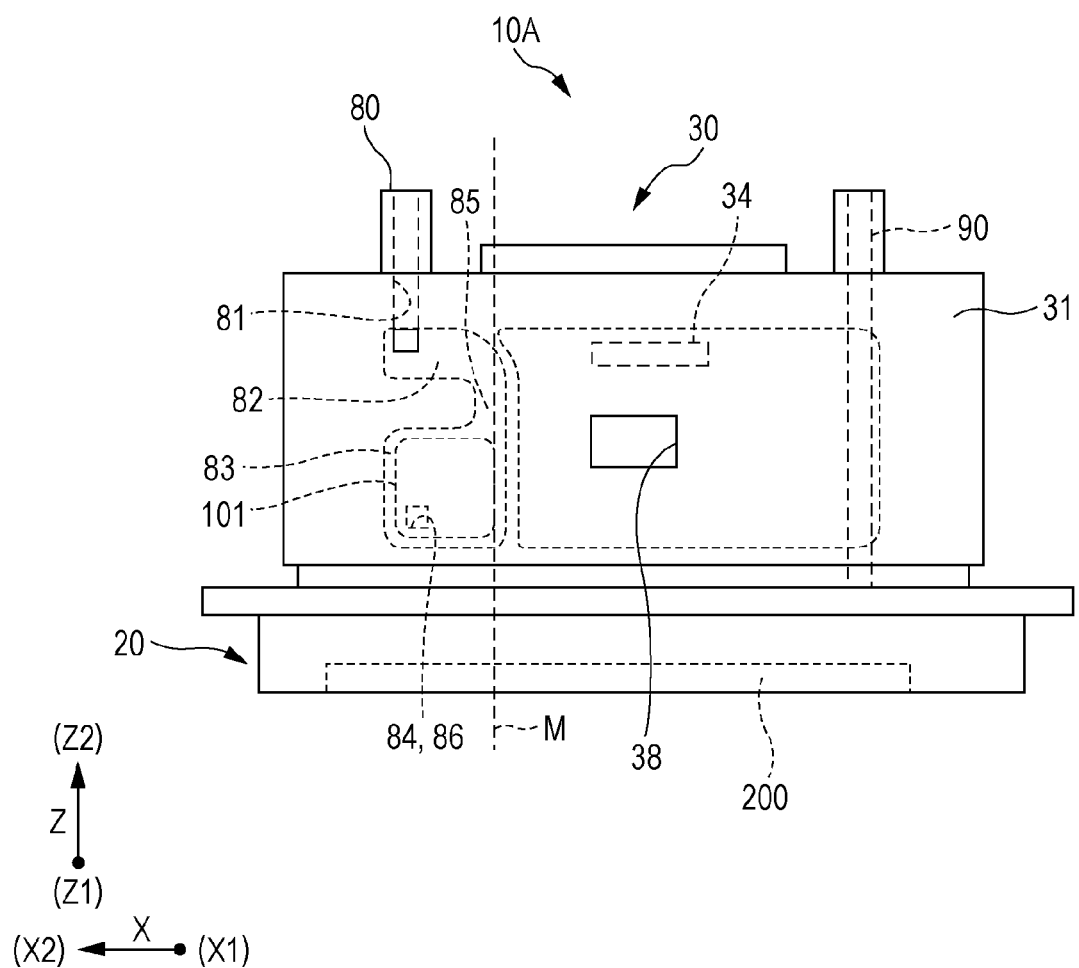
FIG. 17 is a front view of a recording head according to a modification example.

The supply port 85 is formed in the filter chamber 83 which is provided in the filter unit 30. The positional relationship between the supply port 85 and the manifold 200 of the head main body 20 may be as follows. FIG. 17 is a front view of a recording head according to another embodiment. The same reference numerals will be assigned to components which are similar to those of the first embodiment, and redundant description thereof will be omitted.

As illustrated in FIG. 17, the supply port 85 is disposed closer to the inside than the manifold 200 in the X direction (the first direction in an aspect of the invention). In other words, the positional relationship between the supply port 85 and the manifold 200 is defined such that a virtual straight line M, which passes through the supply port 85 and is parallel to the Z direction, passes through the range in the X direction of the manifold 200.

Hypothetically, when the supply port 85 is closer to the outside than the manifold 200, the size of the filter unit main body 33 is formed so as to be large in the X direction, and the supply port 85 is formed in the large region. Therefore, the recording head 10 becomes large in the X direction.

However, according to the recording head 10 according to the embodiment described above, since the supply port 85 is disposed on the inside of the manifold 200 in the X direction, it is possible to reduce the size of the recording head 10A in the X direction.

The recording head of each of the embodiments described above is mounted on an ink jet recording apparatus, which is an example of the liquid ejecting apparatus. Here, description will be given of the ink jet recording apparatus of the present embodiment, FIG. 18 is a schematic perspective diagram illustrating an ink jet recording apparatus, which is an example of the liquid ejecting apparatus according to the other embodiment of the invention.

Figure 18:
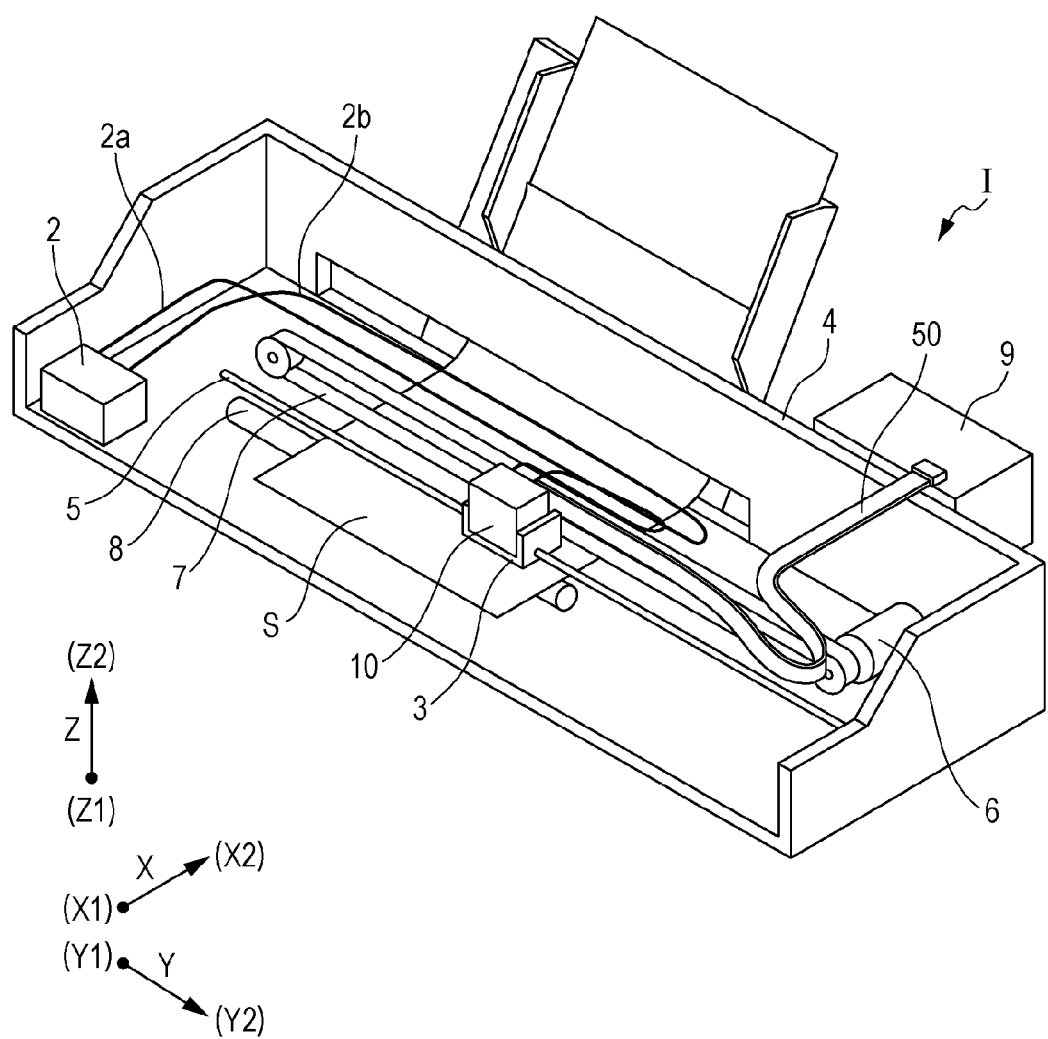
FIG. 18 is a schematic perspective diagram of an ink jet recording apparatus.

As illustrated in FIG. 18, an ink jet recording apparatus I includes a carriage 3 on which the recording head 10 is mounted. The carriage 3 is provided to be movable in the axial direction of a carriage shaft 5 which is attached to an apparatus main body 4.

The carriage 3 having recording head units 1A and 1B mounted thereon is moved along the carriage shaft 5 due to the driving force of a drive motor 6 being transmitted to the carriage 3 via a plurality of gears (not shown), and a timing belt 7. Meanwhile, the apparatus main body 4 is provided with a transport roller 8 as a transport unit, and a recording sheet P, which is a recording medium such as paper, is transported by the transport roller 8. The transport unit which transports the recording sheet P is not limited to being a transport roller, and may be a belt, a drum, or the like.

The ink jet recording apparatus I is provided with a liquid storage unit 2 such as an ink tank which is fixed to the apparatus main body 4, and in which an ink is stored in the inner portion. In the liquid storage unit 2, a supply tube 2a is connected to a collection tube 2b. The supply tube 2a supplies the ink to the recording head 10, and the collection tube 2b collects the ink from the recording head 10.

The supply tube 2a and the collection tube 2b are formed of tube-shaped members such as flexible tubes, and the inner portions thereof are respectively provided with a supply path which supplies the ink and a collection path which collects the ink. One end of the supply tube 2a (the supply path) is connected to the ink introduction port 81 of the supply flow path 80 of the recording head 10, and one end of the collection tube 2b (the collection path) is connected to the collection flow path 90; thus, the ink of the liquid storage unit 2 is supplied to the recording head 10, and the ink from the recording head 10 is collected in the liquid storage unit 2.

While not particularly shown in the drawings, a pressurized filling mechanism such as a pressure pump or a suction pump is provided part way down the supply tube 2a or part way down the collection tube 2b, and the ink is circulated between the liquid storage unit 2 and the recording head 10 by the pumping of the pressurized filling mechanism. In this case, even if the pressurized filling mechanism pumps the ink to the filter unit 30, as described above, bubbles are not easily retained in the filter chamber 83. In this manner, since the retention of bubbles in the filter chamber 83 is suppressed, clogging of the nozzle openings 121 and discharge problems caused by bubbles passing through the filter 101 and reaching the head main body 20 during the printing or the like are suppressed, and the ink jet recording apparatus I with improved reliability is provided.

The ink jet recording apparatus I is provided with a control apparatus 9 which controls the operations of the ink jet recording apparatus I, and the control apparatus 9 is connected to the recording head 10 via the wiring substrate 50.

In the example illustrated in FIG. 18, a configuration is exemplified in which the recording head 10 is mounted on the carriage 3 and moves in the main scanning direction. However, the invention is not particularly limited thereto, and, for example, may also be applied to a so-called line recording apparatus in which the recording head 10 is fixed and printing is performed by only causing the recording sheet P such as the paper to move in the sub-scanning direction.

In FIG. 18, an ink jet recording apparatus using one recording head 10 in which the liquid ejecting surface 120a faces one surface (the XY plane) is exemplified; however, the invention is not particularly limited thereto. For example, it is possible to apply the invention even in the case of an ink jet recording apparatus in which a plurality of the recording heads 10 are present and the liquid ejecting surfaces 120a of each of the recording heads 10 are different surfaces, that is, the liquid ejecting surfaces 120a are disposed to intersect each other.

Figure 19:
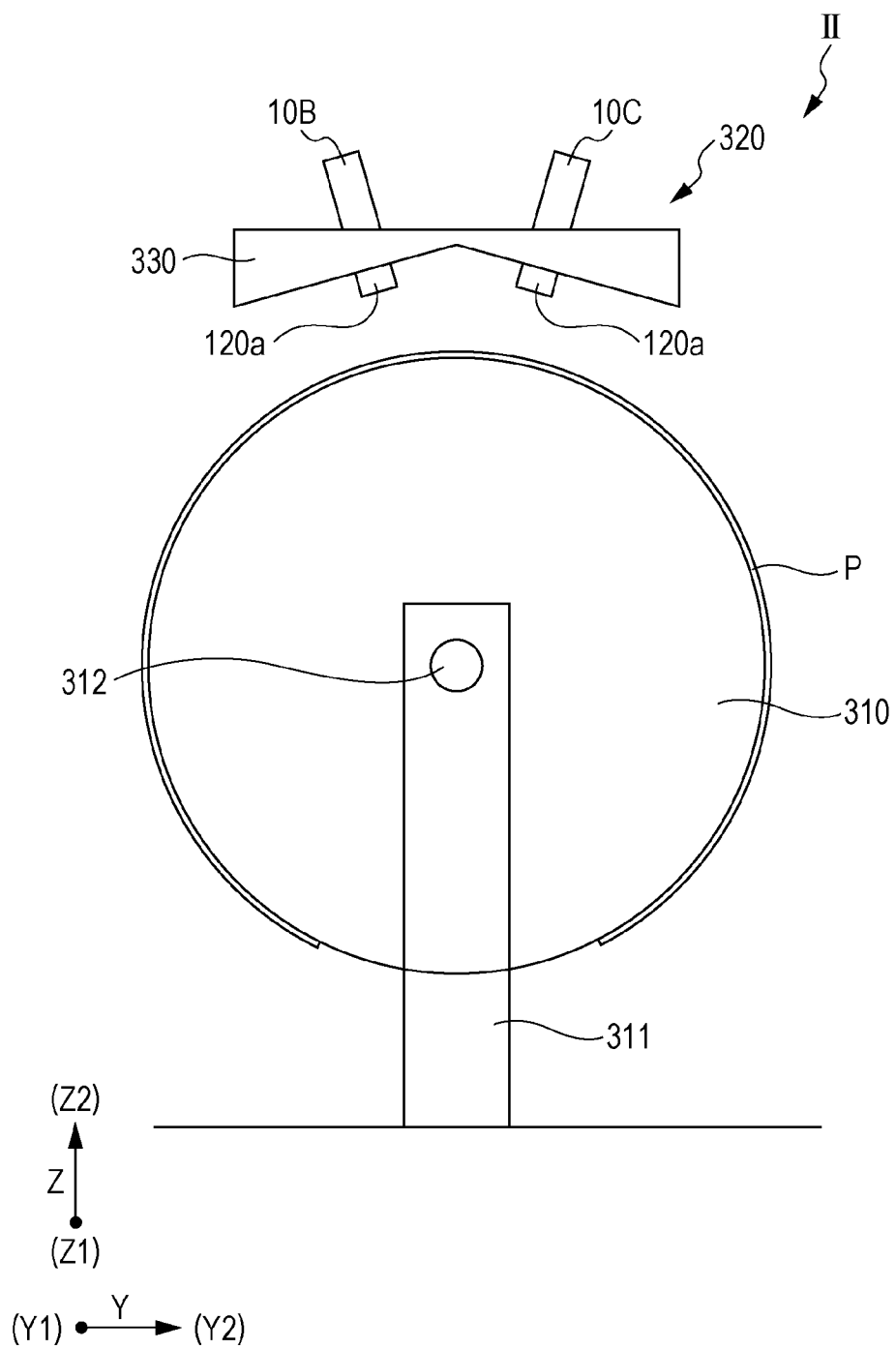
FIG. 19 is a side view of the ink jet recording apparatus.

FIG. 19 is a side view illustrating the main components of the ink jet recording apparatus. As illustrated in the FIG. 19, an ink jet recording apparatus II includes a drum-shaped support drum 310, a head unit 320, and a transport mechanism (not shown). The head unit 320 is disposed on the outer circumference of the support drum 310, and the transport mechanism includes a supply unit (not shown) which supplies the recording sheet P to the support drum 310 and an removal unit (not shown) which removes the recording sheet P from the support drum 310. The recording sheet P is transported along the transport path (the Y direction) by the transport mechanism while being wound around the support drum 310.

The support drum 310 includes a rotating shaft 312 supported on a frame 311, and the support drum 310 rotates in the direction of an arrow R about the rotating shaft 312. In this case, the rotation of the support drum 310 is performed by a drive unit such as a drive motor (not shown).

The support drum 310 supports the recording sheet P on the circumferential surface thereof. The method by which the support drum 310 supports the recording sheet P is not particularly limited. For example, a method in which the recording sheet P is suction-adhered to the surface of the support drum 310 can be exemplified. As another method, one in which the outer circumferential surface of the recording sheet P is charged and caused to adhere onto the support drum 310 by the effect of dielectric polarization can be exemplified. Naturally, a pressing roller or the like which interposes the recording sheet P between itself and the surface of the support drum 310 may be provided.

The head unit 320 includes a head attachment member 330, and a plurality of first recording heads 10B and second recording heads 10C which are fixed to the head attachment member 330. The first recording head 10B and the second recording head 10C are each disposed along the Y direction, which is the transport path.

The first recording heads 10B and the second recording heads 10C are attached to the head attachment member 330 such that the liquid ejecting surfaces 120a intersect each other. In other words, in the first recording heads 10B and the second recording heads 10C, the liquid ejecting surfaces 120a intersect each other in the vertical direction (the Z direction) and each of the liquid ejecting surfaces 120a is fixed to the head attachment member 330 in an intersecting state.

In this manner, when the liquid ejecting surfaces 120a intersect each other in the vertical direction, and the liquid ejecting surfaces 120a of the first recording heads 10B and the second recording heads 10C intersect each other, the filter chamber 83 (refer to FIG. 10) is inclined in relation to the vertical direction. For example, one of the first recording heads 10B is inclined such that the supply port 85 side faces upward (a counter-clockwise rotation from the state of the paper surface shown in FIG. 10), and the other second recording head 10C is inclined such that the supply port 85 side faces downward (a clockwise rotation from the state of the paper surface shown in FIG. 10).

In this manner, even if the filter chamber 83 is inclined in relation to the vertical direction, this does not change the fact that the protruding portion 92 is provided between the supply port 85 and the discharge port 86; thus, as described above, the ink flows through the filter chamber 83 so as to bypass the protruding portion 92. Therefore, since it is possible to cause the ink to flow through the peripheral edge portion of the filter chamber 83 at a high speed even if the filter chamber 83 is filled with the pressurized ink, it is possible to suppress the retention of bubbles in the filter chamber 83.

In the example described above, a recording head 10 in which the ink is supplied from the liquid storage unit 2 to the recording head 10 and the ink is collected in the liquid storage unit 2 is exemplified; however, the invention is not particularly limited thereto, and the invention can be applied to a recording head in which the ink is only supplied to the recording head 10 from the liquid storage unit 2.

In the embodiments described above, the ink jet recording head is given as an example of the liquid ejecting head; however, the invention is widely targeted at liquid ejecting heads, and naturally, it is possible to apply the invention to a liquid ejecting head which ejects a liquid other than the ink. Examples of other liquid ejecting heads include a variety of recording heads that are used in an image recording apparatus such as a printer, color material ejecting heads used in the manufacture of color filters of liquid crystal displays and the like, electrode material ejecting heads used to form electrodes such as EL displays, field emission displays (FED) and the like, and biological organic substance ejecting heads used in the manufacture of bio-chips.

CROSS REFERENCES TO RELATED APPLICATIONS

This application claims priority to Japanese Patent Application No. 2013-270548 filed on Dec. 26, 2013. The entire disclosure of Japanese Patent Application No. 2013-270548 is hereby incorporated herein by reference.

What is claimed is:

1. A filter unit that includes a liquid flow path through which a liquid flows and a filter chamber which forms a portion of the liquid flow path and is filled with a pressurized liquid, the filter unit comprising:
   a first member and a second member which include the liquid flow path and form the filter chamber; and
   a filter which is disposed within the filter chamber,
   wherein the second member is provided with a protruding portion in a region which opposes the filter, and
   wherein the protruding portion is disposed linearly between a supply port of the liquid which is supplied to the filter chamber and a discharge port of the liquid which is discharged from the filter chamber in plan view in relation to the filter.

2. The filter unit according to claim 1,
   wherein an area of the region of the protruding portion which opposes the filter is smaller than an area of an effective region which forms a portion of the filter and covers an opening of the liquid flow path closer to a downstream side than the filter in the liquid flow path in plan view in relation to the filter.

3. The filter unit according to claim 1,
   wherein the protruding portion is contained inside the filter in plan view in relation to the filter.

4. The filter unit according to claim 1,
   wherein the first member includes a ring-shaped rib which surrounds the liquid flow path that is open to the inside of the filter chamber,
   wherein the filter is thermally welded to the rib and seals the liquid flow path, and
   wherein the protruding portion is contained inside the rib in plan view in relation to the filter.

5. The filter unit according to claim 1,
   wherein a groove portion which is open to the second member side is provided in the first member,
   a seal portion which protrudes to the first member side is provided in the second member,
   the seal portion is inserted into the groove portion to form the filter chamber, and
   a space between the inner surface of the groove portion and sides of the sealing portion is filled with a sealant.

6. A liquid ejecting head comprising the filter unit according to claim 1.

7. A liquid ejecting head comprising the filter unit according to claim 2.

8. A liquid ejecting head comprising the filter unit according to claim 3.

9. A liquid ejecting head comprising the filter unit according to claim 4.

10. A liquid ejecting head comprising the filter unit according to claim 5.

11. The liquid ejecting head according to claim 6, further comprising:
    a plurality of pressure generating chambers arranged along a first direction; and
    a manifold which communicates with each of the pressure generating chambers,
    wherein the manifold communicates with the liquid flow path including the filter chamber,
    wherein a supply port of the liquid which is supplied to the filter chamber and a discharge port of the liquid which is discharged from the filter chamber are formed in the filter chamber, and
    wherein the supply port is disposed closer to the inside than the manifold in the first direction.

12. A liquid ejecting apparatus comprising:
    liquid ejecting head according to claim 6; and
    a pressurized filling mechanism which causes a pressurized liquid to flow into the filter chamber.

13. A liquid ejecting apparatus comprising:
    liquid ejecting head according to claim 7; and
    a pressurized filling mechanism which causes a pressurized liquid to flow into the filter chamber.

14. A liquid ejecting apparatus comprising:
    liquid ejecting head according to claim 8; and
    a pressurized filling mechanism which causes a pressurized liquid to flow into the filter chamber.

15. A liquid ejecting apparatus comprising:
    liquid ejecting head according to claim 9; and
    a pressurized filling mechanism which causes a pressurized liquid to flow into the filter chamber.

16. A liquid ejecting apparatus comprising:
    liquid ejecting head according to claim 10; and
    a pressurized filling mechanism which causes a pressurized liquid to flow into the filter chamber.

17. A liquid ejecting apparatus comprising:
    liquid ejecting head according to claim 11; and
    a pressurized filling mechanism which causes a pressurized liquid to flow into the filter chamber.

18. The liquid ejecting apparatus according to claim 12, further comprising:
    a transport mechanism which transports a recording medium along a transport path; and
    first and second liquid ejecting heads disposed along the transport path,
    wherein the first and second liquid ejecting heads have liquid ejecting surfaces disposed in a direction in which the liquid ejecting surfaces intersect each other.

19. The filter unit according to claim 1, wherein the protruding portion has a trapezoidal shape.

* * * * *